US012586300B2

(12) United States Patent
Wald et al.

(10) Patent No.: US 12,586,300 B2
(45) Date of Patent: Mar. 24, 2026

(54) DISTRIBUTED LIGHT TRANSPORT SIMULATION WITH EFFICIENT RAY FORWARDING

(71) Applicant: NVIDIA Corporation, Santa Clara, CA (US)

(72) Inventors: Ingo Wald, Salt Lake City, UT (US); Steven Parker, Draper, UT (US)

(73) Assignee: NVIDIA Corporation, Santa Clara, CA (US)

( * ) Notice: Subject to any disclaimer, the term of this patent is extended or adjusted under 35 U.S.C. 154(b) by 385 days.

(21) Appl. No.: 18/303,858

(22) Filed: Apr. 20, 2023

(65) Prior Publication Data

US 2024/0355043 A1 Oct. 24, 2024

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01); *G06T 2210/21* (2013.01); *G06T 2210/52* (2013.01)

(58) Field of Classification Search
CPC ... G06T 15/506; G06T 15/06; G06T 2210/52; G06T 2210/21
See application file for complete search history.

(56) References Cited

U.S. PATENT DOCUMENTS

| | | | |
|---|---|---|---|
| 7,952,583 | B2 | 5/2011 | Waechter et al. |
| 8,284,188 | B1 | 10/2012 | Lauterbach et al. |
| 9,569,559 | B2 | 2/2017 | Karras et al. |
| 10,249,073 | B2 | 4/2019 | Wald et al. |
| 11,200,725 | B2 | 12/2021 | Muthler et al. |
| 11,908,063 | B2 * | 2/2024 | Thonat .................... G06T 15/04 |
| 2008/0100617 | A1 * | 5/2008 | Keller .................... G06T 15/50 |
| | | | 345/421 |
| 2009/0167763 | A1 * | 7/2009 | Waechter ................ G06T 15/40 |
| | | | 345/426 |

(Continued)

OTHER PUBLICATIONS

Abram, et al.; "Galaxy: Asynchronous Ray Tracing for Large High-Fidelity Visualization," in IEEE 8th Symposium on Large Data Analysis and Visualization (LDAV).

(Continued)

*Primary Examiner* — Abderrahim Merouan
(74) *Attorney, Agent, or Firm* — IRON SUMMIT IP LLP

(57) ABSTRACT

A compute node performing a distributed light transport simulation operation on a scene may select another compute node(s) for forwarding of a ray based on determining graphical data assigned to the other compute node(s) has already been intersection-tested using the ray. Thus, the compute node can avoid forwarding the ray when the graphical data has already been processed using the ray, while providing flexibility in the partition strategy used to partition the scene amongst the compute nodes. The compute node may receive and/or determine traversal information indicating compute nodes that have already intersection-tested the ray and/or have not yet intersection-tested the ray. The traversal information may include a list of compute nodes that have or have not yet intersection-tested the ray. In some examples, the compute node replays the traversal logic used by the compute nodes to generate one or more portions of the list.

20 Claims, 17 Drawing Sheets

(56)                References Cited

U.S. PATENT DOCUMENTS

| | | | | |
|---|---|---|---|---|
| 2018/0089885 A1* | 3/2018 | Wald | | G06T 1/60 |
| 2018/0286104 A1 | 10/2018 | Wald | | |
| 2021/0390756 A1 | 12/2021 | Muthler et al. | | |
| 2022/0392147 A1* | 12/2022 | Bruce | | G06F 16/9027 |
| 2023/0252717 A1* | 8/2023 | Mcallister | | G06T 15/005 |
| | | | | 345/426 |
| 2024/0233251 A1* | 7/2024 | Zhang | | G06T 15/506 |
| 2024/0355043 A1* | 10/2024 | Wald | | G06T 15/506 |
| 2025/0095275 A1* | 3/2025 | Wang | | G06T 15/06 |

OTHER PUBLICATIONS

Ahrens, et al.; "Paraview: An end-user tool for large data visualization," The visualization handbook 717, 8 (2005).

Benthin, et al.; "Improved Two-Level BVHS using Partial Re-Braiding," In Proceedings of High Performance Graphics (2017) 9 pgs.

Burgess; "RTX ON—The NVIDIA Turing GPU," IEEE Micro 40, 2 (2020) 27 pgs.

Burley, et al.; "The Design and Evolution of Disney's Hyperion Renderer," ACM Transactions on Graphics (TOG) (2018). 22 pgs.

Burley, et al.; "Ptex: Per-Face Texture Mapping for Production Rendering," In Eurographics Symposium on Rendering 2008.10 pgs.

Childs, et al.; "Vislt: An End-User Tool For Visualizing and Analyzing Very Large Data," In High Performance Visualization-Enabling Extreme-Scale Scientific Insight (2012) 16 pgs.

DeMarle, et al.; "Memory-Savvy Distributed Interactive Ray Tracing," In 5th Eurographics/ACM SIGGRAPH Symposium on Parallel Graphics and Visualization (EGPGV 2004). 8 pgs.

Ernst, et al.; "Early Split Clipping for Bounding Volume Hierarchies," In IEEE Symposium on Interactive Ray Tracing.

Ganestam, et al.; "SAH Guided Spatial Split Partitioning for Fast BVH Construction," In Rendering Techniques (2016) 10 pgs.

Gropp, et al.; "Distinguished Fellow Emeritus Ewing Lusk," Using MPI: portable parallel programming with the message-passing interface. vol. 1 (1999) 275 pgs.

Grosset, et al.; "TOD-Tree: Task-Overlapped Direct Send Tree Image Compositing for Hybrid MPI Parallelism and GPUs," IEEE Transactions on Visualization and Computer Graphics 23, 6 (2017). 14 pgs.

Hapala, et al.; "Efficient Stack-less BVH Traversal for Ray Tracing," In SCCG '11: Proceedings of the 27th Spring Conference on Computer Graphics, Apr. 2011, 7 pgs.

Ize, et al.; "Real-Time Ray Tracer for Visualizing Massive Models on a Cluster," In Eurographics Symposium on Parallel Graphics and Visualization, 2011, 9 pgs.

Jaros, et al.; "GPU Accelerated Path Tracing of Massive Scenes," ACM Transaction on Graphics 40, 2 (2021), 18 pgs.

Kerras, et al.; "Fast Parallel Construction of High-quality Bounding Volume Hierarchies," In High-Performance Graphics Conference, 2013, 11 pgs.

Kato, et al.; "Kilauea"—Parallel Global Illumination Renderer. In Fourth Eurographics Workshop on Parallel Graphics and Visualization (2002) 11 pgs.

Moreland, Kenneth; "IceT Users' Guide and Reference," Technical Report. Sandia National Labs, 2011, 198 pgs.

Park, et al.; "SpRay: Speculative Ray Scheduling for Large Data Visualization," In IEEE Symposium on Large Data Analysis and Visualization, 2018, 10 pgs.

Parker, et al.; "Optix: A General Purpose Ray Tracing Engine," Acm transactions on graphics (tog) 29, 4 (2010), 13 pgs.

Pharr, et al.; "Rendering complex scenes with memory-coherent ray tracing," In SIGGRAPH '97: Proceedings of the 24th annual conference on Computer graphics and interactive techniques, 1997, 8 pgs.

Reinhard,; "Scheduling and Data Management for Parallel Ray Tracing," Ph.D. Dissertation. University of East Anglia, 1995, 144 pgs.

Salmon, et al.; "A Hypercube Ray-Tracer," In C3P: Proceedings of the third conference on Hypercube concurrent computers and applications—vol. 2, 13 pgs.

Stich, et al.; "Spatial Splits in Bounding Volume Hierarchies," In HPG '09: Proceedings of the Conference on High Performance Graphics 2009, 7 pgs.

Vaidyanathan, et al.; "Wide BVH Traversal with a Short Stack," in High-Performance Graphics—Short Papers, 2019, 5 pgs.

Wald, et al.; "Digesting the Elephant—Experiences with Interactive Production Quality Path Tracing of the Moana Island Scene," http://arxiv.org/abs/2001.02620 arXiv 2001.02620, 2020, 10 pgs.

Wald, et al.; "Interactive Distributed Ray Tracing of Highly Complex Models," In Eurographics Workshop on Rendering Techniques, 2001, 14 pgs.

Wald, et al.; "Embree: A Kernel Framework for efficient CPU Ray Tracing," ACM Transactions on Graphics (TOG) 33, 4 (2014), 8 pgs.

Walker, et al.; "MPI: A Standard Message Passing Interface", Supercomputer Dec. 12, 1995, 17 pgs.

Wyman; "Weighted Reservoir Sampling: Randomly Sampling Streams", In Ray Tracing Gems II—Next-Generation Real-Time Rendering with DXR, Vulkan, and OptiX, APress, Chapter 22 (2021) 5 pgs.

Xie, et al.; "Real Time Cluster Path Tracing", https://arxiv.org/abs/2110.08913, Oct. 21, 2021, 5 pgs.

Zellmann, et al.; "Finding Efficient Spatial Distributions for Massively Instanced 3-D Models", In EGPGV Eurographics/EuroVis. (2020) 11 pgs.

* cited by examiner

100

500

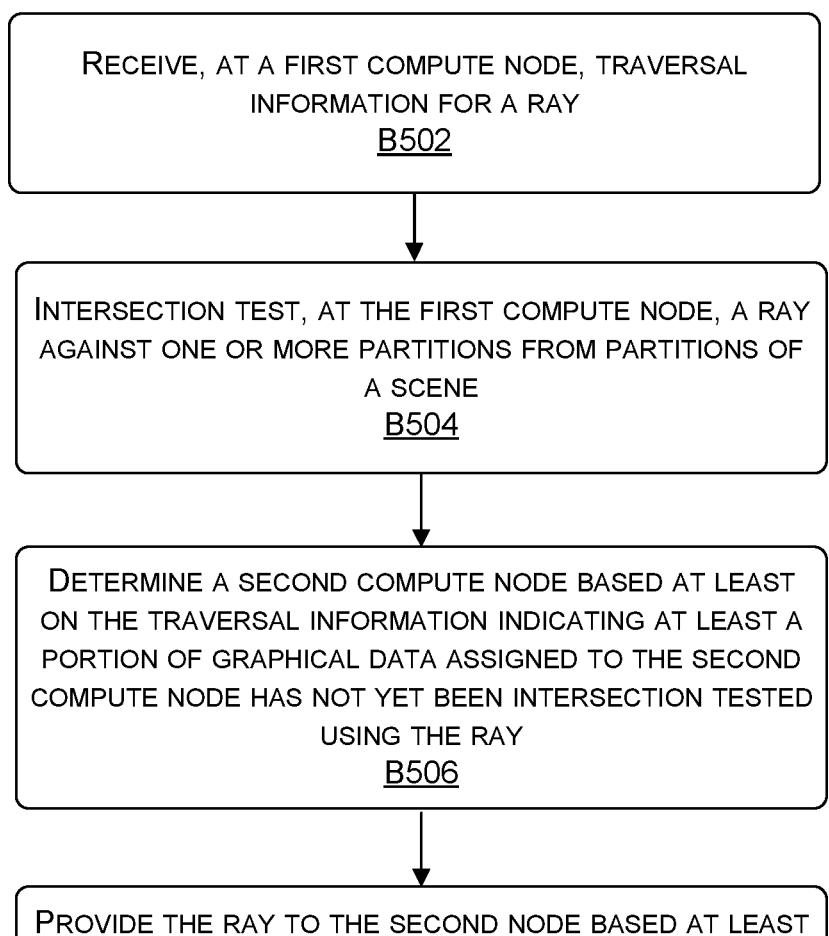

RECEIVE, AT A FIRST COMPUTE NODE, TRAVERSAL
INFORMATION FOR A RAY
B502

INTERSECTION TEST, AT THE FIRST COMPUTE NODE, A RAY
AGAINST ONE OR MORE PARTITIONS FROM PARTITIONS OF
A SCENE
B504

DETERMINE A SECOND COMPUTE NODE BASED AT LEAST
ON THE TRAVERSAL INFORMATION INDICATING AT LEAST A
PORTION OF GRAPHICAL DATA ASSIGNED TO THE SECOND
COMPUTE NODE HAS NOT YET BEEN INTERSECTION TESTED
USING THE RAY
B506

PROVIDE THE RAY TO THE SECOND NODE BASED AT LEAST
ON THE DETERMINING TO CAUSE THE SECOND NODE TO
PERFORM ONE OR MORE PORTIONS OF A DISTRIBUTED RAY
TRACING OPERATION
B508

INTERSECTION TEST, AT A FIRST COMPUTE NODE, A RAY
AGAINST ONE OR MORE PARTITIONS FROM PARTITIONS OF
A SCENE
B602

SELECT A SECOND COMPUTE NODE BASED AT LEAST ON
DETERMINING AT LEAST A PORTION OF GRAPHICAL DATA
ASSIGNED TO THE SECOND COMPUTE NODE HAS NOT YET
BEEN INTERSECTION TESTED USING THE RAY
B604

PROVIDE THE RAY TO THE SECOND NODE BASED AT LEAST
ON THE SELECTING TO CAUSE THE SECOND NODE TO
PERFORM ONE OR MORE PORTIONS OF A DISTRIBUTED RAY
TRACING OPERATION
B606

FIGURE 6

To/From XBar 770

GPC 750

PIPELINE MANAGER 810

PROP 815

MPC 830

PRIMITIVE ENGINE 835

SM 840

DPC 820(V)

RASTER ENGINE 825

WDX 880

MMU 890

To/From XBar 770

To/From XBar 770

TO/FROM
XBAR 770

MEMORY PARTITION UNIT
780

ROP 850

L2 CACHE 860     TO/FROM
XBAR 770

MEMORY INTERFACE
870

TO/FROM
MEMORY 704

Figure 9C:
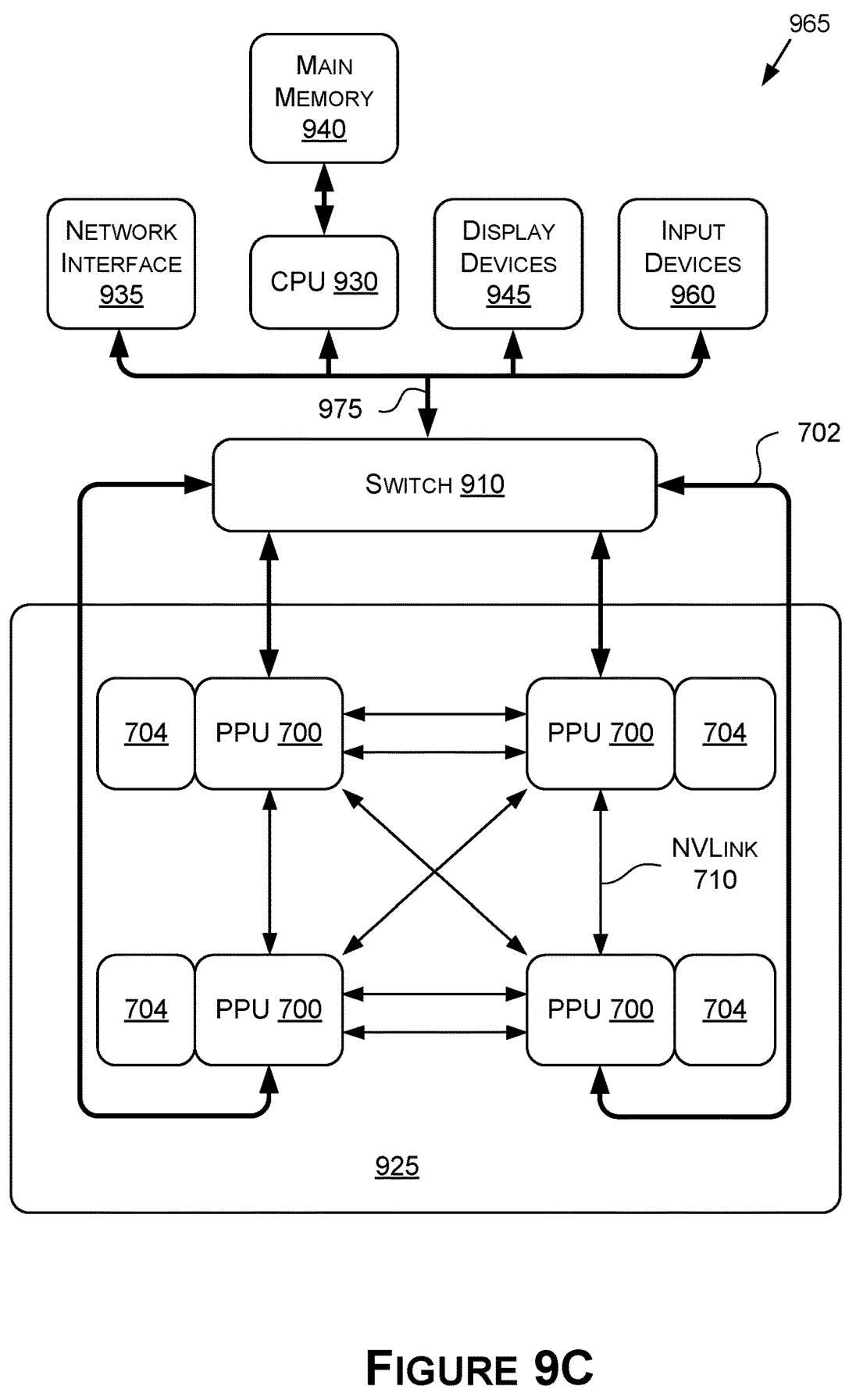

965

MAIN MEMORY 940

NETWORK INTERFACE 935

CPU 930

DISPLAY DEVICES 945

INPUT DEVICES 960

975

702

SWITCH 910

704

PPU 700

PPU 700

704

NVLINK 710

704

PPU 700

PPU 700

1000

```
        ┌─────────────────────┐
        │  RAY GENERATION     │
        │      1002           │
        └─────────────────────┘
                  │
                  ▼
        ┌─────────────────────┐        ┌─────────────────────┐
        │   ACCELERATION      │───────▶│    ANY HIT          │
        │   STRUCTURE         │        │     1004            │
        │   TRAVERSAL         │        └─────────────────────┘
        │     1020            │                  ▲
        └─────────────────────┘        ┌─────────────────────┐
                  │                     │  INTERSECTION       │
                  │                     │     1006            │
                  │                     └─────────────────────┘
                  ▼
       NO      ◇ HIT? ◇      YES
     ┌─────────         ─────────┐
     ▼                           ▼
┌─────────────┐          ┌─────────────────┐
│   MISS      │          │   CLOSEST HIT   │
│   1008      │          │     1010        │
└─────────────┘          └─────────────────┘
```

DISTRIBUTED LIGHT TRANSPORT SIMULATION WITH EFFICIENT RAY FORWARDING

BACKGROUND

Data-parallel (or data-distributed) rendering refers to a paradigm of rendering techniques used to render three-dimensional (3D) graphics using graphical data distributed across different compute nodes. Data-parallel rendering has been used to render 3D graphics when the graphical data is too large to fit into the memory of a single node, or when the graphical data is already distributed across compute nodes and cannot easily or efficiently be merged for rendering. In data-parallel rendering, each compute node may perform operations on the portion of the graphical data that is assigned to the compute node, and the compute nodes may exchange messages to share results of the operations. When data-parallel rendering is used to simulate light transport effects that ray trace a scene across different nodes, such as path tracing, the messages may include rays or other data that is forwarded across the compute nodes.

Conventional approaches to data-parallel rendering spatially partition the scene into grids, octrees, k-d trees, or other discrete and non-overlapping spatial units, then assign entire spatial partitions to different compute nodes for processing. However, for some scenes, no matter where or how the a scene is split between the spatial partitions, base meshes of the objects in the scene may extend beyond a single spatial domain, such that multiple partitions will need to store copies of the corresponding graphical data. Thus, spatial partitioning approaches may have high per node storage requirements. Additionally, spatial partitioning often results in partitions that cover large spatial regions. When rays are traced using data-parallel rendering, the rays must frequently be forwarded between compute nodes. Thus, to avoid high storage and bandwidth requirements, data-parallel rendering typically is performed on simple scenes using image compositing-based rendering approaches that are incompatible with light transport simulation effects such as path tracing.

SUMMARY

Embodiments of the present disclosure relate to distributed light transport simulation with efficient ray forwarding. Systems and methods are disclosed that may be used to reduce the number of times that rays need to be forwarded to perform distributed light transport simulation operations while providing flexibility in scene partitioning.

In contrast to conventional systems, such as those described above, a compute node performing a distributed light transport simulation operation on a scene may select another compute node(s) for forwarding of a ray based at least on determining whether graphical data assigned to the other compute node(s) has already been intersection-tested and/or processed using the ray. Thus, the compute node can avoid forwarding the ray to a compute node when the graphical data has already been processed using the ray, while providing significant flexibility in the strategy used to partition the scene amongst the compute nodes. In at least one embodiment, a compute node may receive and/or determine one or more portions of traversal information indicating one or more compute nodes that have already intersection-tested the ray and/or have not yet intersection-tested the ray. The traversal information may include a list of compute nodes that have or have not yet intersection-tested the ray. In at least one embodiment, the compute node may generate one or more portions of the list based at least on replaying at least a portion of the traversal logic used by the compute nodes to perform a distributed light transport simulation operation.

BRIEF DESCRIPTION OF THE DRAWINGS

The present systems and methods for distributed light transport simulation with efficient ray forwarding are described in detail below with reference to the attached drawing figures, wherein:

FIG. 5 is a flow diagram showing a method for using received traversal information to determine a compute node for ray forwarding in distributed light transport simulation, in accordance with some embodiments of the present disclosure;

FIG. 6 is a flow diagram showing a method for selecting a compute node for ray forwarding in distributed light transport simulation based at least on determining the compute node has not yet intersection-tested a ray, in accordance with some embodiments of the present disclosure;

FIG. 9C illustrates an example system in which the various architecture and/or functionality of the various embodiments may be implemented;

FIG. 10 illustrates an example ray tracing pipeline suitable for use in implementing at least some embodiments of the present disclosure;

DETAILED DESCRIPTION

Figure 1:
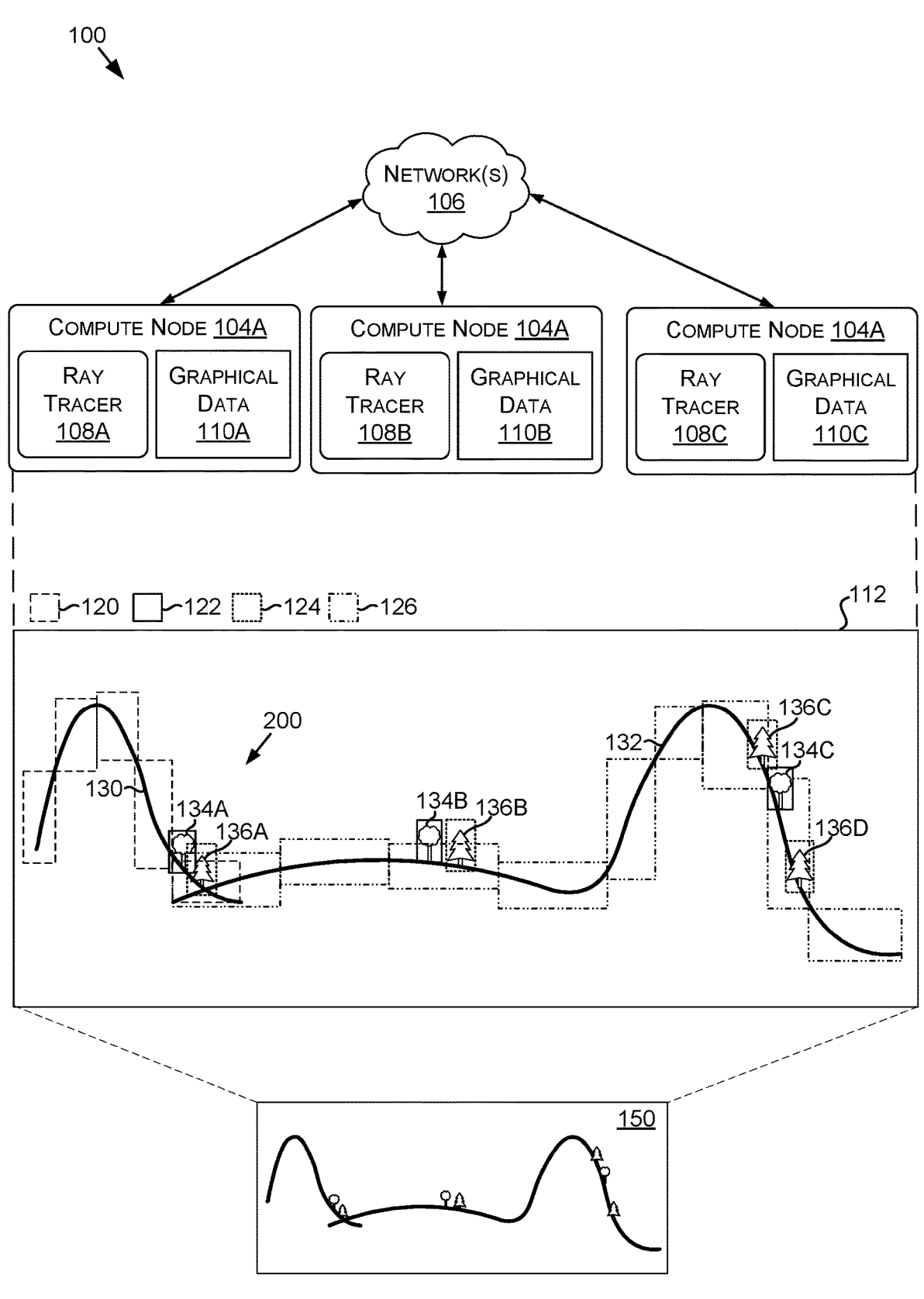
FIG. 1 illustrates an example of a distributed light transport simulation system, in accordance with some embodiments of the present disclosure.

Systems and methods are disclosed related to distributed light transport simulation with object-hierarchy partitioning. Disclosed approaches may be used to reduce the number of times that rays need to be forwarded to perform distributed light transport simulation operations while providing flexibility in scene partitioning.

In at least one embodiment, a compute node performing a distributed light transport simulation operation—such as a ray traversal operation, for example and without limitation—on a scene may select another compute node(s) for forwarding of a ray based at least on determining whether at least a portion of graphical data assigned to the other compute node(s) has already been intersection-tested and/or processed using the ray. Thus, the compute node can avoid forwarding the ray to a compute node when the graphical data has already been processed and/or intersection-tested, while providing significant flexibility in the strategy used to partition the scene amongst the compute nodes. For example, disclosed approaches may be used to reduce ray forwarding for spatial partitioning strategies, object-space partitioning strategies, and/or hybrid partitioning strategies. In at least one embodiment, multiple partitions may be used per object and/or object instance—allowing for tight coverage where rays are unlikely to intersect the partitions without also intersecting the geometry therein. Further, partitions assigned to different compute nodes may at least partially overlap while avoiding infinite ray forwarding loops.

In at least one embodiment, a compute node may receive and/or determine one or more portions of traversal information for a ray. For example, the compute node may receive traversal information with a ray that is forwarded to the compute node. The traversal information may indicate one or more compute nodes that have already intersection-tested the ray and/or have not yet intersection-tested the ray. Thus, the compute node may use the traversal information to determine when to forward the ray to a particular compute node(s). In at least one embodiment, the traversal information includes a list of compute nodes that have and/or have not yet intersection-tested the ray (e.g., in the form of a bit mask). In at least one embodiment, the traversal information includes information the compute node may use to generate one or more portions of the list. In at least one embodiment, to generate one or more portions of the list, the compute node may replay at least a portion of the traversal logic used by the compute nodes to perform a distributed light transport simulation operation. Thus, the amount of data transmitted between the compute nodes may be reduced. For example, the traversal information may indicate an initial compute node that generated the ray, and the compute node may replay the traversal logic used by the compute nodes starting from the initial compute node to generate one or more portions of the list.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems for performing operations using a large language model, and/or other types of systems.

FIG. 1 depicts an example of a distributed light transport simulation system 100 (also referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may be implemented using, among other components, at least two compute nodes, such as compute nodes 104A and 104B through 104N (also referred to as "compute nodes 104"), and one or more networks, such as a network(s) 106. Although compute nodes 104 and the network 106 are shown, the system 100 may include more or fewer components. By way of example, and not limitation, a client application (e.g., on a client device) and/or other software may use the network 106 to receive rendered images from the system 100, provide or define one or more portions of graphical data for the scene 112, cause the images to be rendered, etc.

Components of the system 100 may communicate over the network(s) 106. The network(s) 106 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In at least one embodiment, the network 106 includes one or more device-to-device networks, such as a parallel processing unit (PPU)-to-PPU network, an example of which includes an NVLink network. Further example of the network(s) 106 include an InfiniBand (IB) network or an Omni-Path network. In any example, each of the components of the system 100 may communicate with one or more of the other components via one or more of the network(s) 106.

Examples of the compute nodes 104 include any combination of one or more processing units, such as one or more PPUs, one or more graphics processing units (GPUs), one or more central processing units (CPUs), one or more coprocessors, one or more accelerated processing units (APUs), one or more tensor processing units (TPUs), one or more field programmable gate arrays (FPGAs), one or more computing instances (e.g., cloud-based computing instances), one or more virtual devices, and/or one or more application-specific integrated circuits (ASICs).

In at least one embodiment, one or more of the compute nodes 104 may be distributed across multiple computing systems, and/or one or more of the compute nodes 104 may be co-located on a same computing system. Non-limiting examples of computing systems include, for example, a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, a server, a server device, a cloud computing system, a client device, an edge device, any combination of these delineated devices, or any other suitable device or system.

The compute nodes 104 may collaborate to render an image of a scene 112, such as an image 150, using any of a variety of collaborate rending techniques, such as data-parallel rendering. For example, to render the image 150, the compute nodes 104 may collaboratively perform any of a variety of light transport simulation operations on graphical data, such as path tracing, ray tracing, ray marching, etc. As such, each compute node 104 may store a portion or partition of graphical data 110 and include a ray tracer 108 to perform one or more ray tracing operations using the portion of the graphical data 110. For example, the compute node 104A includes a ray tracer 108A and graphical data 110A (which may also be referred to as a portion of the graphical data 110), the compute node 104B includes a ray tracer 108B and graphical data 110B, and the compute node 104N includes a ray tracer 108N and graphical data 110N.

The system 100 may use various approaches for implementing collaborative rendering using the compute nodes 104. Using ray forwarding-based approaches a compute node 104 may be responsible for processing a subset of light transport simulation tasks corresponding to the portion of the graphical data 110 assigned to the compute node (e.g., the local data), such as intersection testing, ray generation, ray shading, and/or ray tracing. When a compute node 104 generates a ray(s) (e.g., a primary ray, a secondary ray, etc.) and/or processes a ray(s) forwarded to that compute node 104 from another compute node 104, the compute node 104 may determine one or more other compute nodes 104 include one or more portions or partitions of the graphical data 110 that correspond to the ray(s). Thus, the compute node 104 may forward the ray(s) to one or more other compute nodes 104 for processing using one or more corresponding portions or partition of the graphical data 110. In at least one embodiment, multiple compute nodes 104 may be assigned at least some of the same graphical data 110 and/or at least one of the same partitions or portions thereof (e.g., one or more of the same objects, instances, and/or portions thereof). In such examples, any number of the compute nodes 104 may process and/or intersection test the replicated graphical data. A ray may be propagated and forwarded using the ray tracers 108 until one or more end conditions are reached for traversal.

In at least one embodiment, communication between the compute nodes 104 may be implemented using a message passing framework such as a message passing interface (MPI). The MPI may provide a set of standard functions for sending and receiving messages between the compute nodes, allowing the compute nodes 104 to exchange data efficiently and reliably.

In at least one embodiment, to facilitate data-parallel rendering, the compute nodes 104 may each have a view of the scene 112 being rendered and how the portions or partitions of the graphical data 110 are distributed amongst the compute nodes 104. Various approaches may be used to partition the graphical data 110 into the portions of graphical data 110, which may also be referred to as partitions of graphical data 110. The portions of the graphical data 110 assigned to a compute node 104 may correspond to one or more partitions of the scene 112 that are assigned to the compute node 104.

In at least one embodiment, the scene 112 may be, at least in part, spatially partitioned into grids, octrees, k-d trees, and/or other spatial units, with the spatial partitions being assigned to different compute nodes 104 for processing and storage. In at least one embodiment, the scene 112 may be, at least in part, object-space partitioned. Using object-space partitioning, the scene 112 may be partitioned into non-spatial scene partitions. In one or more embodiments, the partitions may be represented using one or more object hierarchies, such as volume hierarchies, where proceeding levels of an object hierarchy may partition the scene 112 into smaller and smaller volumes. For example, the partitions may correspond to bounding volume hierarchies (BVHs), which the ray tracers 108 of the compute nodes 104 may use to accelerate ray tracing operations for corresponding portions of the scene 112. In at least one embodiment, the scene 112 may be partitioned using one or more other approaches, such as a hybrid partitioning approach. In at least one embodiment, the hybrid partitioning approach is based on spatial and object-space partitioning.

In the example of FIG. 1, the compute node 104A is assigned a partition(s) 120 corresponding to the graphical data 110A, the compute node 104B is assigned a partition(s) 126 corresponding to the graphical data 110B, and the compute node 104N is assigned a partition(s) 122 and a partition(s) 124 corresponding to the graphical data 110N. In the example of FIG. 1, objects, instances, and/or meshes in the scene 112 may be represented by more than one partition. For example, an instance 130 (e.g., corresponding to a mountain) is represented using five partitions 120, and an instance 132 (e.g., another mountain) is represented using nine partitions 126. As a further example, an instance 134A, an instance 134B, and an instance 134C of a same object (e.g., a tree) are represented using three corresponding partitions 122. Similarly, an instance 136A, an instance 136B, an instance 136C, and an instance 136D of a same object (e.g., a tree) are represented using four corresponding partitions 126. Also, in the example of FIG. 1, partitions may at least partially overlap. For example, a partition 122 corresponding to the instance 134A partially overlaps with a partition 120, a partition 124, and a partition 126.

Creating one partition per instance may lead to large partitions for some objects, which in turn may require many rays to be sent to a corresponding compute node 104. Thus, a spatially large object may be represented using more than one partition, with the volumes of the partitions collectively covering the object more tightly than one single volume. For example, the instance 130 may be represented using multiple partitions, rather than using one partition having one large bounding volume. Thus, rays may pass around the partition(s) 120 that otherwise would have hit the partition. While rays may encounter multiple partitions for the same object, traversal logic or strategies described herein may be used to avoid forwarding the rays for each intersecting partition.

While each instance, object, or one or more portions thereof may be assigned to one compute node 104, in at least one embodiment, one or more of the graphical elements may be assigned to multiple compute nodes 104. Further, one or more objects, such as spatially large (and thus, likely to get traversed) objects that have a low memory footprint, may be replicated to more than one compute node 104, such that the objects (or portions thereof) are more readily available. Disclosed approaches may be used to prevent a graphical element from unnecessarily being intersection-tested multiple times, regardless of whether graphical data corresponding to the graphical element is assigned to multiple compute nodes 104 or a single compute node 104.

Figure 2:
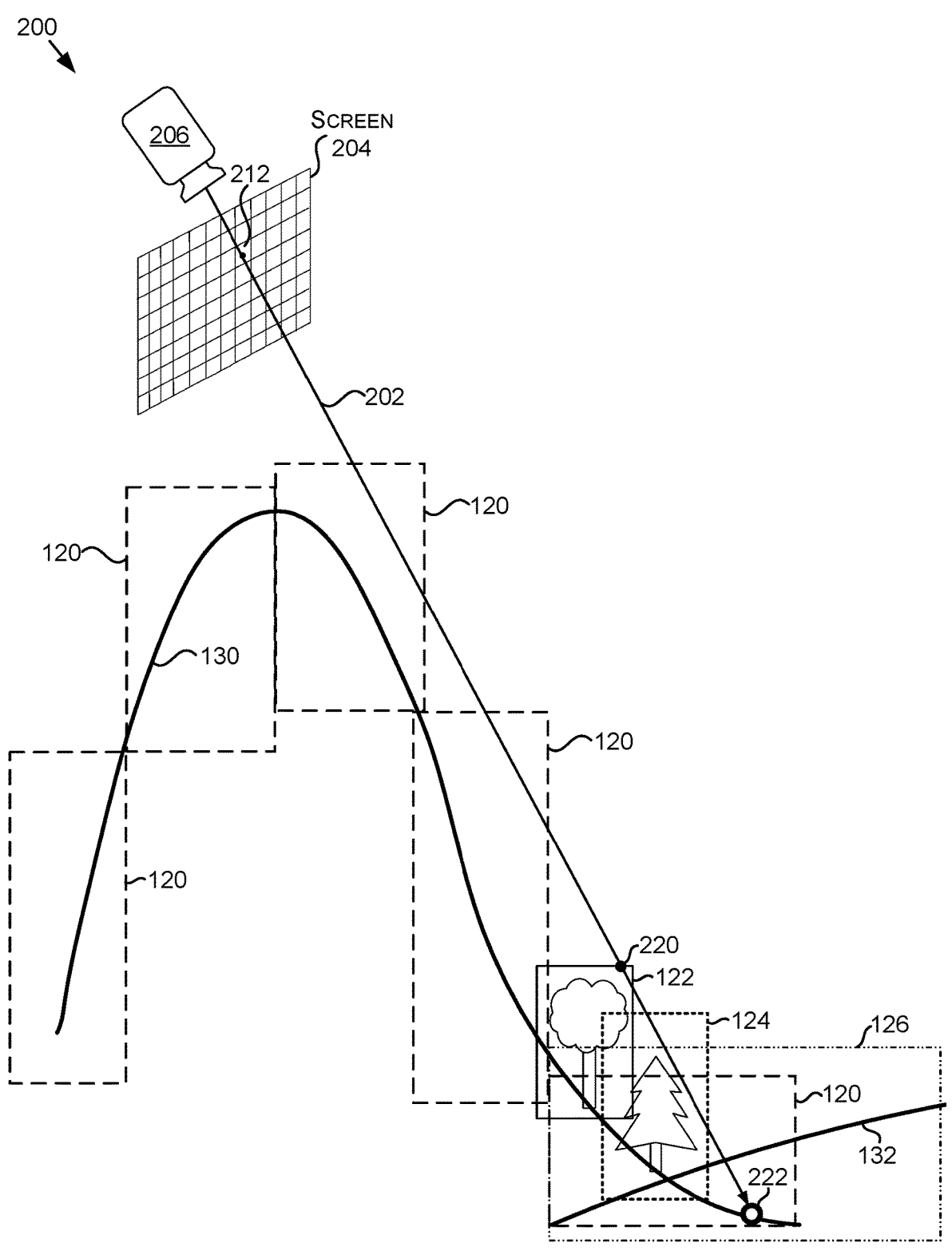
FIG. 2 illustrates an example of a compute node processing a ray in a distributed light transport simulation operation, in accordance with some embodiments of the present disclosure.

Referring now to FIG. 2, FIG. 2 illustrates an example of a compute node 104A processing a ray 202 in a distributed light transport simulation (e.g., ray tracing) operation 200, in accordance with some embodiments of the present disclosure. As described above, the compute node 104A may be assigned the partitions 120 of the scene 112. Thus, the compute node 104 may intersection test the ray 202 against the partitions 120 to determine whether the ray 202 interacts with any geometry and/or other graphical elements corresponding to the portion of the graphical data 110A. Where the compute node 104A does not determine traversal for the ray 202 should be terminated, the compute node 104A may forward the ray 202 to one or more other compute nodes 104.

In at least one embodiment, forwarding a ray may include transmitting a position of the ray, an origin of the ray, and/or a direction of the ray. In at least one embodiment, forwarding a ray may include transmitting one or more truncation values (e.g., a T value), indicating a current and/or closest geometry intersection point(s) for the ray. In at least one embodiment, forwarding a ray may include transmitting one or more values indicating a ray type(s), such as whether the ray is a shadow ray, is in a medium, etc. In at least one embodiment, forwarding a ray may include transmitting one or more values indicating one or more amounts of light being transmitted or transported by the ray, such as one or more throughput values indicating the total light energy being transported by the ray (both direct and indirect lighting). In at least one embodiment, forwarding a ray may include transmitting one or more values, such as a hit mask, indicating the compute nodes 104 and/or partitions where it was determined that the ray interacted with the local geometry. In at least one embodiment, forwarding a ray may include transmitting pixel information for the ray. Pixel information may include or indicate one or more pixels corresponding to the ray (e.g., a pixel identifier), such as a pixel 212 of a virtual grid or screen 204 corresponding to the ray 202 cast from a virtual eye or camera 206 (world space and/or screen space pixel locations may be used for the ray tracing). In at least one embodiment, pixel information may include or indicate color and/or other render information for the pixel(s).

In at least one embodiment, hit information for rays need not be transmitted for forwarding the rays. Thus, paths may be re-traced by a compute node 104 for shading (e.g., to re-compute information such as texture coordinates, differential surface, etc. from the mesh included in the compute node 104). Re-tracing paths for shading may be less resource intensive than sending each ray's hit information across the network 106 for forwarding. In at least one embodiment, a compute node identifier may be stored for the compute node 104 that produced a hit. However, using a compute node mask may be useful if a ray is forwarded and terminates on another compute node 104, as the other compute node 104 may check the compute node mask to determine whether it includes the data, so that the ray can be shaded there without being sent back to the initial compute node 104.

Typically, when performing data-parallel rendering with ray tracing, rays are forwarded to every other compute node 104 for processing. Thus, the compute node 104A may forward the ray 202 to the compute node 104B and the compute node 104N. However, forwarding a ray to every compute node 104 may be computationally inefficient and consume excess bandwidth, as the ray may not interact with the portion of the graphical data 110 for every compute node 104. For example, while the ray 202 intersects with the partitions of each of the compute nodes 104 shown in FIGS. 1 and 2, there may be other partitions of other compute nodes 104 that the ray 202 does not intersect with. Thus, while this approach may be suitable when the scene 112 is simple and/or does not include many compute nodes 104, the bandwidth and computational requirements may be prohibitive for complex scenes.

In at least one embodiment, a compute node 104 has access to spatial information regarding other partitions of one or more other compute nodes 104 in the scene 112. For example, each compute node 104 may include spatial location information for the partitions in the scene 112. The spatial information may represent proxy volumes corresponding to the partitions. Thus, the compute node 104 may use the spatial location information (e.g., for intersection testing the ray against the proxy volumes) to determine a compute node(s) 104 having a partition(s) that intersects with the ray and may forward the ray to the compute node(s) 104 that correspond to the intersection(s) (e.g., only to the compute nodes 104 for which an intersection is identified). For example, the compute node 104A may determine the ray intersects with a partition 122, a partition 124 and a partition 126, and forward the ray 202 to each of those partitions accordingly. Forwarding the ray 202 to each compute node 104 that includes a partition that the ray 202 intersects may be viable when the scene 112 is fully spatially partitioned and/or simple. However, partitions in the scene 112 may overlap, an object or instance may be split into multiple partitions, and/or one or more of the same graphical elements may be assigned to multiple compute nodes 104. As a result, infinite loops may occur where the ray 202 is continuously forwarded to a previously visited node and/or the same graphical elements may be unnecessarily intersection-tested multiple times. Further, the number of forwarded rays used in this approach may still consume significant bandwidth.

In accordance with at least one embodiment, a compute node 104 may determine to forward a ray to another compute node(s) 104 based at least on determining graphical data assigned to the other compute node(s) 104 has not yet been intersection-tested and/or processed using the ray. As such, infinite loops and/or redundant processing may be avoided. In the example of FIG. 2, the compute node 104A may determine to forward the ray 202 to the compute node 104B based at least on determining the ray 202 has not yet been intersection-tested and/or processed at the compute node 104B. The compute node 104 may further determine to forward the ray 202 to the compute node 104B based at least on determining the ray 202 intersects with a partition(s) 122 assigned to the compute node 104B (e.g., as indicated by an intersection point 220).

Figure 3:
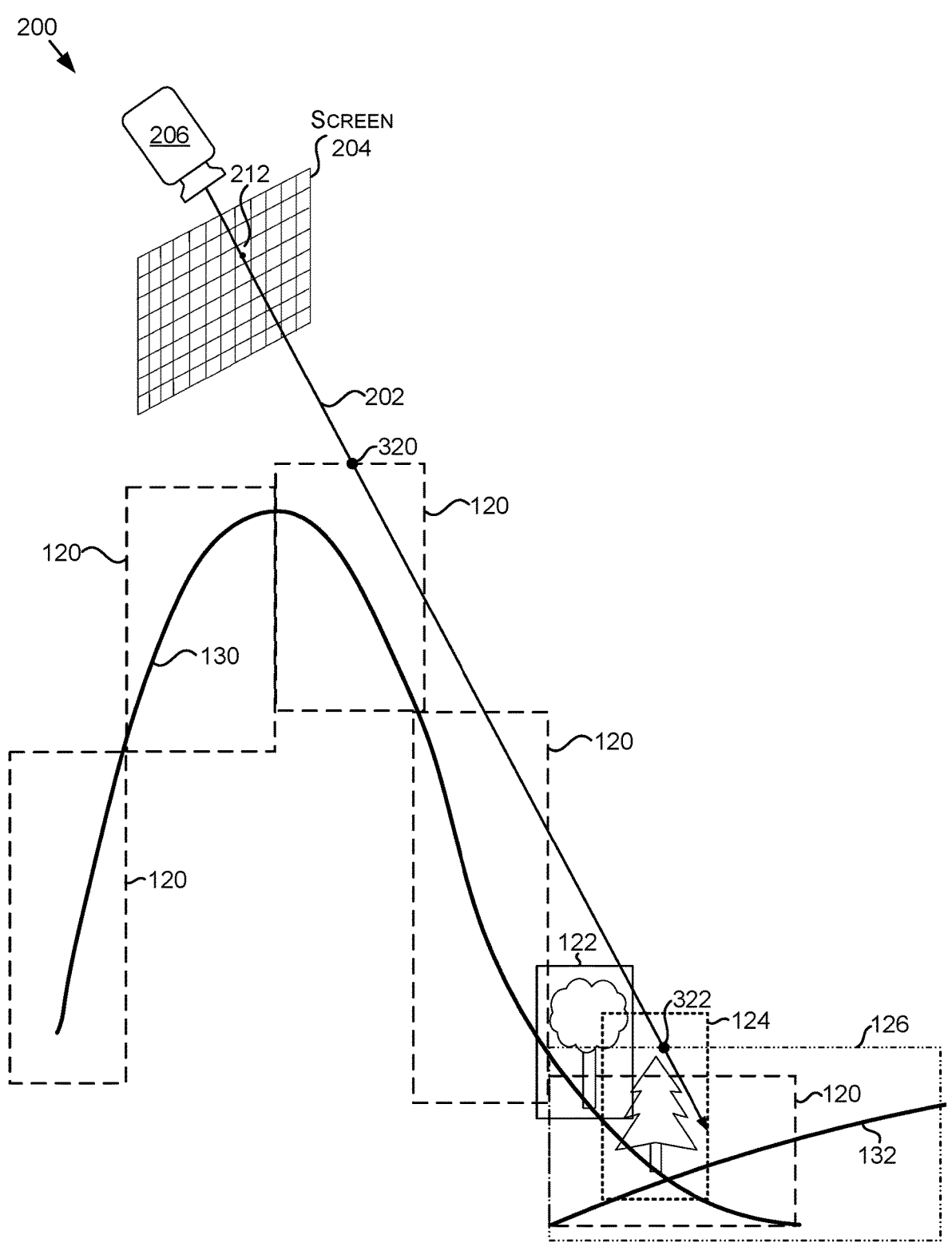
FIG. 3 illustrates an example of another compute node processing the ray in the distributed light transport simulation operation of FIG. 2, in accordance with some embodiments of the present disclosure.

FIG. 3 illustrates an example of the compute node 104B processing the ray 202 in the distributed light transport simulation operation 200, in accordance with some embodiments of the present disclosure. Based at least receiving the ray 202, the compute node 104B may process (e.g., intersection test) the ray 202. Further, similar to the compute node 104A, the compute node 104B may use spatial location information to determine a compute node(s) 104 having a partition(s) that intersects with the ray and may forward the ray to the compute node(s) 104 that corresponds to the intersection(s) (e.g., only to a compute node(s) 104 for which an intersection is identified). For example, the compute node 104B may determine the ray 202 intersects with a partition(s) 120 (e.g., as indicated by an intersection point 320) and/or a partition(s) 126 (e.g., as indicated by an intersection point 322).

Figure 4:
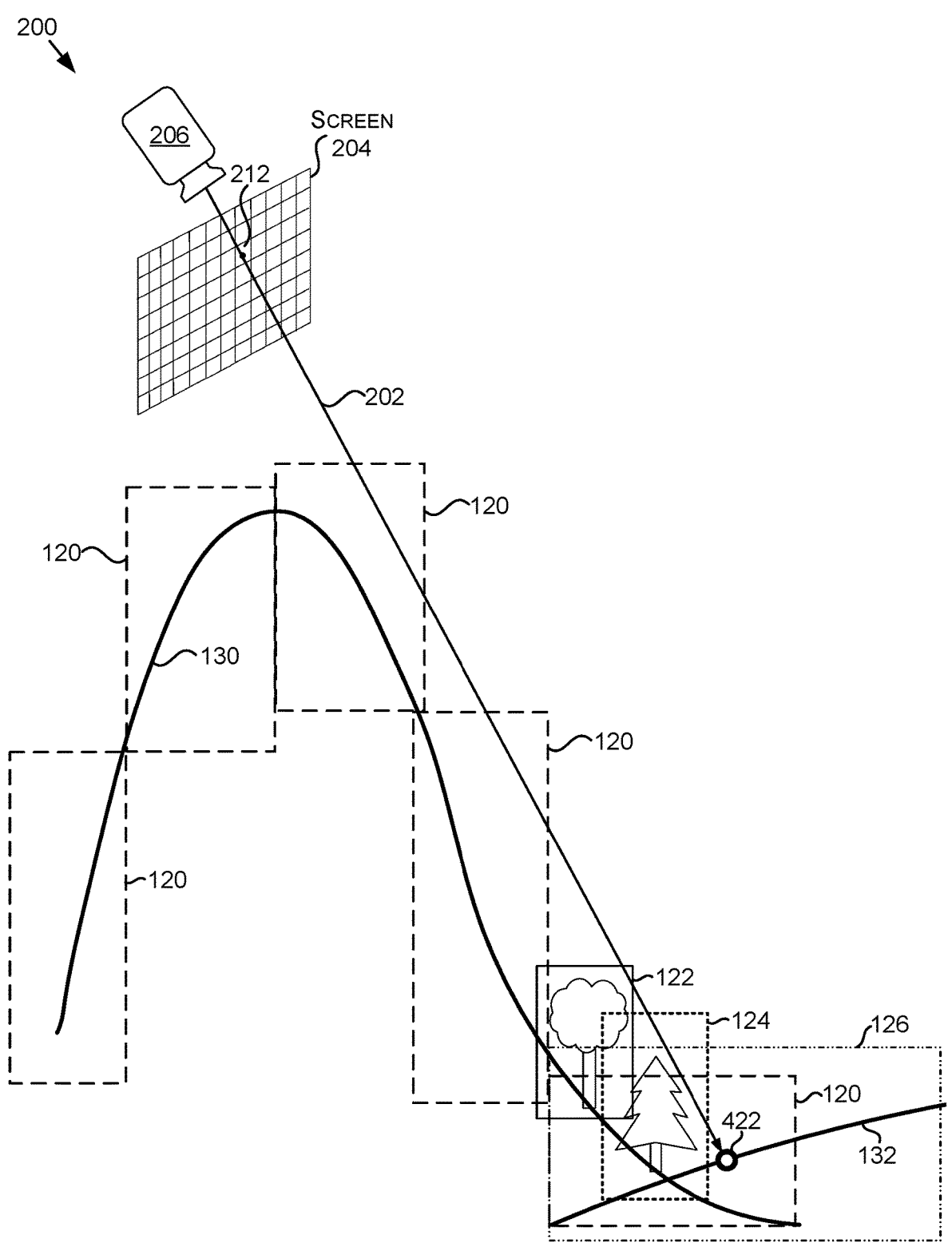
FIG. 4 illustrates an example of yet another compute node processing the ray in the distributed light transport simulation operation of FIGS. 2 and 3, in accordance with some embodiments of the present disclosure.

Depending on the traversal strategy being used by the system 100, it may be possible that the compute node 104B forwards the ray 202 back to the compute node 104A based on detecting the intersection with the partition(s) 120 (e.g., where there the traversal strategy is to forward the ray to the compute node 104 that has the closest intersecting partition to the ray origin or corresponding pixel). However, the compute node 104B may instead forward the ray 202 to the compute node 104N based at least on determining the compute node 104A has already processed and/or intersection-tested the ray 202. FIG. 4 illustrates an example of the compute node 104N processing the ray 202 in the distributed light transport simulation operation 200, in accordance with some embodiments of the present disclosure.

A compute node 104 may use various approaches to determine another compute node 104 has already processed and/or intersection-tested a ray and/or to determine another compute node 104 that has not yet processed and/or intersection-tested the ray. Whether a compute node 104 has already intersection-tested a ray may indicate whether one or more portions of graphical data assigned to the compute node 104 has already been intersection-tested. In at least one embodiment, the compute node 104 uses traversal information for the ray to make the determination(s), where the traversal information indicates one or more compute nodes that have already and/or have not yet processed and/or intersection-tested the ray. In at least one embodiment, the traversal information includes a list of one or more compute nodes that have already and/or have not yet processed and/or intersection-tested the ray (and/or one or more graphical elements and/or partitions that have not yet been intersection-tested using the ray). In at least one embodiment, the traversal information includes information the compute node 104 may use to compute one or more portions of the list(s).

In at least one embodiment, the compute node 104 may compute one or more portions of the traversal information and/or may receive one or more portions of the traversal information from one or more other entities such as one or more other compute nodes 104. For example, a compute node 104 may receive one or more portions of the traversal information for a ray based at least on the ray being forwarded to the compute node 104. As an example, the traversal information may be received with and/or in association with a ray from another compute node 104 that is forwarding the ray to the compute node 104.

In at least one embodiment, the traversal information includes a list, which may be implemented using a bitmask, where one bit may be used per compute node 104 (or partition, or graphical element) to indicate whether corresponding graphical data has previously been processed using the ray. Information in the list may be generated and/or updated for a compute node 104 that includes the ray prior to the compute node 104 forwarding the ray. However, for a large number of compute nodes 104, a significant amount of data may be needed to record the traversal information that is transmitted between the compute nodes 104.

Thus, in at least one embodiment, the data that is transmitted between the compute nodes 104 to communicate traversal information for the rays may be reduced based at least on a compute node 104 replaying one or more portions of the distributed light transport simulation operation to compute one or more portions of the traversal information. For example, rather than the compute node 104N receiving a list that indicates the compute nodes 104A and 104B have already processed the ray 202, the compute node 104N may replay one or more portions of the distributed light transport simulation operation 200.

The information a compute node 104 uses to replay one or more portions of a distributed light transport simulation operation may depend on the traversal strategy used by the compute nodes 104 to forward rays in the system 100 and/or the traversal information provided to the compute node 104. In at least one embodiment, the traversal information for a ray includes and/or indicates the compute node 104 that generated the ray. For example, the compute node 104N may receive an indication that the ray 202 was generated by the compute node 104A. The compute node 104N may then re-run the traversal logic or strategy implemented by the compute nodes 104 for the ray 202 from the compute node 104A until the ray 202 reaches the compute node 104N. In at least one embodiment, the traversal logic or strategy may not require the compute node 104N to receive any additional traversal information than a forwarded ray. For example, in at least one embodiment, the compute node 104 that generated the ray may be implicit in the traversal logic or strategy.

In at least one embodiment, once a ray intersecting a given partition is sent to the compute node 104 used to process the partition (or a ray is generated in the given partition), the compute node 104 does not limit intersection testing of local geometry for the ray to that partition and/or corresponding object instance. For example, the compute node 104A may perform intersection testing against geometry for each of the partitions 120 that intersect the ray 202. Similarly, the compute node 104B may perform intersection testing against each of the partitions 122 and the partitions 124 that interest the ray 202. Thus, the number of times the ray 202 needs to be forwarded may be reduced, as the ray 202 need not be processed by the same compute node 104 more than once.

In at least one embodiment, the distributed light transport simulation operation 200 may be processed using front-to-back traversal. For example, a compute node 104 may determine and/or select for forwarding of a ray the compute node 104 that has the closest partition to a pixel 212 and/or ray origin which has not yet intersection-tested the ray against local geometry (e.g., using replay and/or a bit mask as described herein). Further, in at least one embodiment, the traversal strategy or logic of the distributed light transport simulation operation 200 may be configured to generate primary rays and/or paths on the compute node 104 that is assigned a closest partition for the pixel being traced using the ray (e.g., the pixel 212 being traced using the ray 202). This approach may increase the chance that the ray will have an intersection on the compute node 104 that generated the ray. In at least one embodiment, a compute node 104 may use the spatial information (e.g., proxy volumes) regarding the partitions to determine whether the compute node 104 is assigned the closest partition, and if so, generate the ray.

In at least one embodiment, using strict front-to-back traversal may not guarantee, for a newly spawned secondary ray, that a compute node 104 that spawned the secondary ray will be selected first for forwarding. However, the ray would eventually need to be intersection-tested at the compute node 104. Thus, the distributed light transport simulation operation 200 may be configured to first trace a ray at the compute node 104 that generated the ray. In various examples, the compute node 104 that generates a ray is most likely to include the closest geometry to the ray origin that interacts with the ray. For example, for shadow rays, an occluder may frequently be processed using the compute node 104. Thus, the compute node 104 may not need to forward the ray to any other compute node 104.

Disclosed approaches may be used for distributed path tracing and/or for other light transport simulation techniques (e.g., ray tracing). In at least one embodiment, forwarding logic used by the compute nodes 104 to forward rays may use an acceleration structure built over the partitions, with an intersection program, or shader, that rejects testing a ray against any partitions for which it is determined that the ray has already visited. If no partitions remain for testing, traversal may terminate, and shading may proceed. For shading, the current compute node 104 may determine whether the ray can be shaded on the compute node 104 and if so, the compute node 104 may perform the shading. If not, the compute node 104 may pseudo-randomly or otherwise select a compute node 104 from the hit mask of the ray for shading.

In at least one embodiment, the compute nodes 104 use the distributed light transport simulation operation 200 to process a wavefront of rays, which may include the ray 202, and trace the rays across the compute nodes 104 until each ray has terminated traversal and is on a compute node 104 where shading can occur. In at least one embodiment, each ray may be traced into the local geometry of a corresponding compute node 104. An any hit program, or shader, may be used to perform alpha testing, and a closest-hit program, or shader, may be used to update the ray's T value and hit mask if a closer intersection with geometry is found. For example, when the ray 202 is processed by the compute node 104A, the compute node 104A may update the T value to correspond to an interaction 222 and update the hit mask to indicate a hit on the compute node 104A and/or the partition 120. When the ray 202 is processed by the compute node 104N, the compute node 104N may update the T value to correspond to an interaction 422 based at least on the interaction 422 being closer to the pixel 212 and/or ray origin than the interaction 222. Further, the compute node 104N may update the hit mask to indicate a hit on the compute node 104N and/or the partition 126. In embodiments where a bit mask is used to record visited nodes, the compute node 104 may further update the bit mask for the ray. Further, the compute node 104 may evaluate a next-node operator based at least on tracing the ray into the acceleration structure to determine whether to forward the ray to another compute node.

In at least one embodiment, a compaction kernel may be used to rearrange the rays, such that rays that can be shaded locally are provided to one compute node 104 (or a different compute node), and rays that may need to be forwarded are provided to another compute node 104. In at least one embodiment, the rays that may need to be forwarded are sorted by the compute nodes 104 that are to receive the rays. Once the rays are arranged, the compute nodes 104 may collaboratively execute an MPI all gather operation to exchange the rays amongst the compute nodes 104. An MPI all-to-all operation may be used to move the rays to their respective destination compute nodes 104. The distributed light transport simulation operation 200 may continue until no more rays need exchanging, at which point each compute node 104 may include a wavefront of rays ready to be shaded on the compute node 104.

After a wavefront has been traced to completion, each compute node 104 may locally shade corresponding rays. In at least one embodiment, a compute node 104 may determine whether shadow rays that terminated traversal on the compute node 104 intersected an occluder, and if so, those shadow rays may be discarded. Otherwise, throughput values for the shadow rays may be atomically added into the frame buffer of the compute node 104. For non-shadow rays, if an intersection has not been found, the rays may be shaded using background and/or environmental light, and the lighting information corresponding to the ray may be accumulated into the frame buffer.

In at least one embodiment, for a non-shadow ray where an intersection has been found, the compute node 104 may re-trace the ray into local geometry to re-compute the full hit and surface data (e.g., Bidirectional Reflectance Distribution Function (BRDF) data). In at least one embodiment, the compute node 104 may sample the full BRDF to produce either a reflected or refracted ray, modify a throughput value of the ray according to the sampled BRDF, and use rejection sampling to avoid tracing rays where the throughput value is below a threshold value. A secondary ray, if not rejected, may be appended to a wavefront queue for subsequent traversal.

In at least one embodiment, shading may result in a compute node 104 generating a shadow ray. Repeated reservoir sampling and importance sampling may be used to select at most a defined number of samples (e.g., one sample) from possibly multiple different lights and light types to prevent the possibly of unlimited growth of the wavefront queue. Thus, in at least one embodiment, a pixel may have at most two rays active at any time: one for the path itself, and one for a corresponding shadow ray. In at least one embodiment, for a shadow ray, a compute node 104 may first compute the pixel contribution for the shadow ray if the shadow ray were not occluded. A value for the pixel contribution may then be stored in the throughput field, and a bit may be set for the path that flags the ray as a shadow ray.

For primary rays, the forwarding logic may cause each compute node 104 to generate every primary ray and trace the primary ray into the acceleration structure for the partitions. The primary owner of the ray may then be selected based at least on the compute nodes 104 determining the compute node 104 that is assigned or owns the closest partition, as described herein, and all other compute nodes

104 may discard the ray. In at least one embodiment, if a ray hits a partition that is stored on more than one compute node 104, additional one or more selection criteria may be used to determine the primary owner of the ray, such as the pixel identifier.

In at least one embodiment, rays generated on a compute node 104 may terminate on another compute node 104, and a pixel may receive a contribution for that compute node 104. In at least one embodiment, any shading contributions may be sent back to the compute node 104 that generated the path and/or ray. However, this approach may be resource intensive. In at least one embodiment, each compute node 104 may maintain a full frame buffer (a partial-sum frame) for all the image contributions computed on that compute node 104. The frame buffers from the compute nodes 104 may be combined (e.g., added together) to form the final image. In at least one embodiment, each compute node 104 may be responsible for one part of the final frame buffer and may receive the contributions from the other compute nodes 104. The compute node 104 may then combine the contributions from the other compute nodes 104, perform tone mapping, and send the final shaded pixels (e.g., red, green, blue, alpha (RGBA) values) to the compute node(s) 104 that is responsible for display or storage.

As described herein, various aspects of the disclose may be used in combination with various partitioning strategies, such as spatial, object-space, or hybrid partitioning strategies. In at least one embodiment, a partitioning strategy may start with one partition containing the whole scene 112. An iterative process may be applied where in each iteration the largest partition is split (e.g., into two partitions). For objects with more than one instance, the individual instances of that object may be used. For objects with only one instance, the object may be broken into constituent meshes (or the meshes may be split meshes into individual triangles and/or other primitives).

Spatial partitioning may start with an initial domain set to the bounding box of the scene 112. In each split, multiple non-overlapping portions may be created (e.g., two halves) while checking which objects overlap each other's domain. After each step, each side's domain may be shrunk to the content it contains, if possible. Various approaches may be used to determine where to split. In at least one embodiment, each domain may be split at its spatial median. In at least one embodiment, a cost function may be used to select amongst candidate splits (e.g., 3×7 equidistant candidate splits with 7 split planes in each of the three dimensions). The cost function may be based at least on computing a quantity of unique meshes, triangles, vertices, texels, etc., each compute node 104 has, then the quantities may be evaluated based at least on an estimated memory cost for each such item. The final cost of a split may correspond to a blend (e.g., 50:50) between a surface area heuristic (SAH) and the sum of these memory estimates. SAH may estimate the cost of splitting a domain based at least on the surface area of the bounding boxes of the objects inside the domain. In at least one embodiment, the domain boxes may be used as partitions and proxy volumes.

Object-space partitioning may operate on objects, as opposed to instances. In at least one embodiment, all instances of an object are provided to the same compute node 104. For each object a volume (e.g., bounding box) may be created around all of the instances. The volume may be used to sort the object left or right of any candidate plane (e.g., 3×7 planes). A candidate may be selected for a partition using similar or different approaches as described for spatial partitioning. In at least one embodiment, the same volumes used for partitioning may be used as the partitions or proxy volumes. In at least one embodiment, one partition may be created for each instance, and smaller partitions may be created for non-instanced meshes. In at least one embodiment, the smaller partitions may be created based at least on performing a number of BVH build steps on the mesh.

Hybrid partitioning may combine spatial and object-space partitioning. For example, the scene 112 may be partitioned based at least on instances, not objects-so some instances may be replicated (e.g., in accordance with the cost function). Otherwise partitioning may be performed similar to object-space partitioning, using the same or a different cost function. Each instanced or non-instanced mesh may be enclosed in a separate volume or bounding box, and the volumes may be used as the partitions or proxy volumes for rendering.

Now referring to FIGS. 5 and 6, each block of methods 500 and 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 500 and 600 are described, by way of example, with respect to the system 100 of FIG. 1. However, this method may additionally or alternatively be executed by any one system, or any combination of systems, including, but not limited to, those described herein.

FIG. 5 is a flow diagram showing a method 500 for using received traversal information to determine a compute node for ray forwarding in distributed light transport simulation, in accordance with some embodiments of the present disclosure. The method 500, at block B502 includes receiving, at a first compute node, traversal information for a ray. For example, the compute node 104B may receive from the compute node 104A of the compute nodes 104 performing the distributed light transport simulation operation 200, traversal information for the ray 202 (e.g., as part of ray forwarding).

At block B504, the method 500 includes intersection testing, at the first compute node, a ray against one or more partitions from partitions of a scene. For example, the compute node 104B may intersection test the ray 202 against the partitions 122 and the partitions 124 assigned to the compute node 104B from partitions of the scene 112 that are distributed amongst the compute nodes 104.

At block B506, the method 500 includes determining a second compute node based at least on the traversal information indicating at least a portion of graphical data assigned to the second compute node has not yet been intersection-tested using the ray. For example, the compute node 104B may determine the compute node 104N from the compute nodes 104 based at least on the traversal information indicating the compute node 104N has not yet intersection-tested the ray 202 in the distributed light transport simulation operation 200.

At block B508, the method 500 includes providing the ray to the second node based at least on the determining to cause the second node to perform one or more portions of a distributed light transport simulation operation. For example, the compute node 104B may provide the ray 202 to the compute node 104N based at least on the determining, the providing causing the compute node 104N to perform one or more portions of the distributed ray tracing operation.

FIG. 6 is a flow diagram showing a method 600 for selecting a compute node for ray forwarding in distributed light transport simulation based at least on determining the compute node has not yet intersection-tested the ray, in accordance with some embodiments of the present disclosure. The method 600, at block B602, includes intersection testing, at a first compute node, a ray against one or more partitions from partitions of a scene. For example, the compute node 104B of the compute nodes 104 performing the distributed light transport simulation operation 200, may intersection test the ray 202 against the partitions 122 and the partitions 124 assigned to the compute node 104B from partitions of the scene 112 that are distributed amongst the compute nodes 104.

At block B604, the method 600 includes select a second compute node based at least on determining at least a portion of graphical data assigned to the second node has not yet been intersection-tested using the ray. For example, the compute node 104B may select the compute node 104N from the compute nodes 104 based at least on determining the compute node 104N has not yet intersection-tested the ray 202 in the distributed light transport simulation operation 200.

At block B606, the method 600 includes providing the ray to the second node based at least on the selecting to cause the second node to perform one or more portions of a distributed light transport simulation operation. For example, the compute node 104B may provide the ray 202 to the compute node 104N based at least on the selecting, the providing causing the compute node 104N to perform one or more portions of the distributed light transport simulation operation.

Example Parallel Processing Architecture

Figure 7:
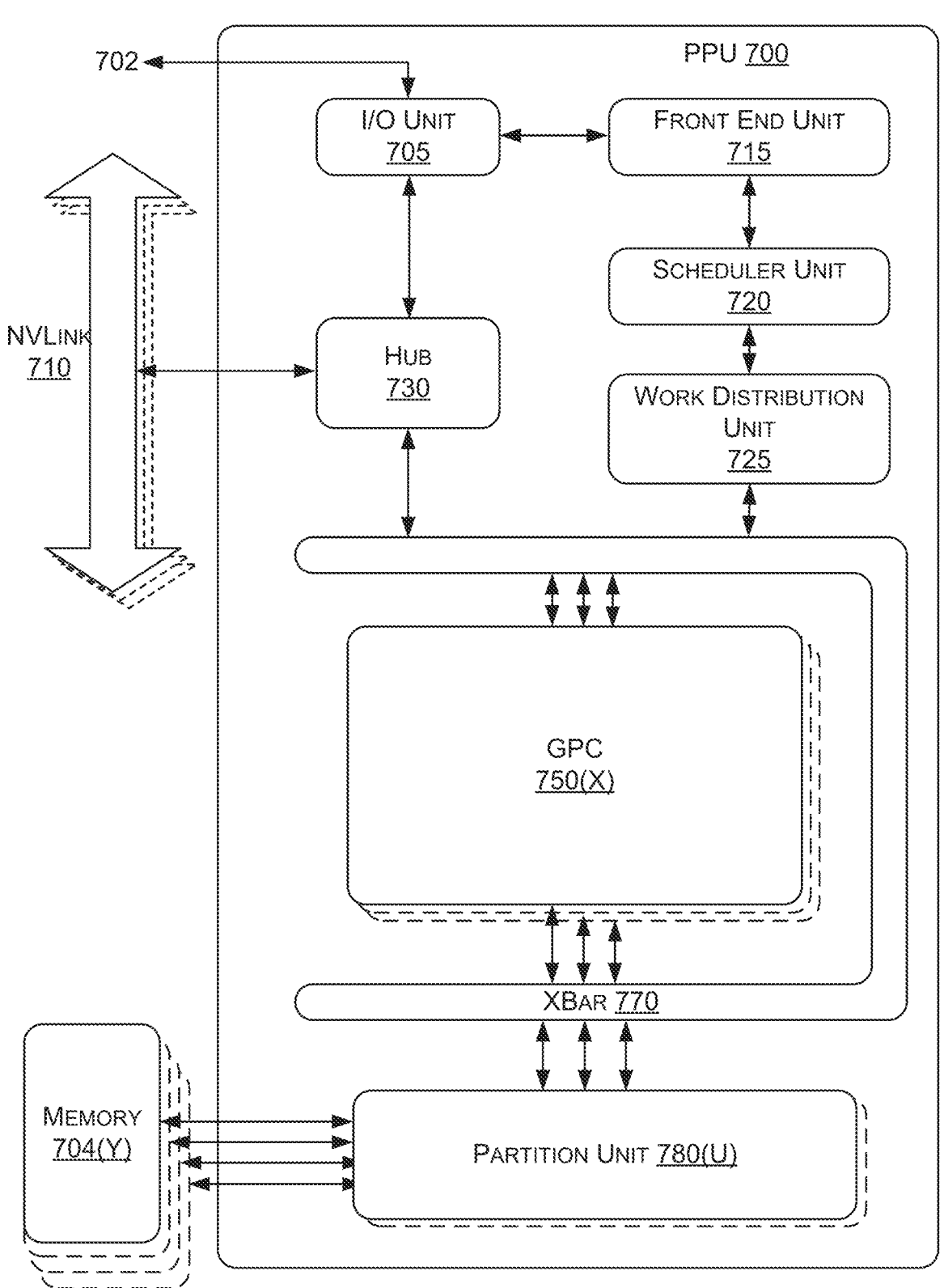
FIG. 7 illustrates an example parallel processing unit suitable for use in implementing at least some embodiments of the present disclosure.

FIG. 7 illustrates an example parallel processing unit (PPU) 700 suitable for use in implementing at least some embodiments of the present disclosure. In at least one embodiment, the PPU 700 is a multi-threaded processor that is implemented on one or more integrated circuit devices. The PPU 700 may have a latency hiding architecture designed to process many threads in parallel. A thread (e.g., a thread of execution) may refer to an instantiation of a set of instructions configured to be executed by the PPU 700. In at least one embodiment, the PPU 700 is a graphics processing unit (GPU) configured to implement a graphics rendering pipeline for processing three-dimensional (3D) graphics data in order to generate two-dimensional (2D) image data for display on a display device such as a liquid crystal display (LCD) device. In one or more embodiments, the PPU 700 may be used for performing general-purpose computations. While one parallel processor is provided herein for illustrative purposes, it should be noted that such processor is set forth for illustrative purposes only, and that any processor may be employed to supplement and/or substitute for the same.

One or more PPUs 700 may be configured to accelerate, by way of example and not limitation, thousands of High-Performance Computing (HPC), data center, and machine learning applications. The PPU 700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, light transport simulation, astronomy, molecular dynamics simulation, financial modeling, robotics, digital twinning, synthetic data generation, factory automation, real-time language translation, online search optimizations, personalized user recommendations, and the like.

As shown in FIG. 7, the PPU 700 includes an Input/Output (I/O) unit 705, a front end unit 715, a scheduler unit 720, a work distribution unit 725, a hub 730, a crossbar (Xbar) 770, one or more general processing clusters (GPCs) 750, and one or more partition units 780. The PPU 700 may be connected to a host processor or other PPUs 700 via one or more high-speed NVLink 710 interconnect. The PPU 700 may be connected to a host processor or other peripheral devices via an interconnect 702. The PPU 700 may also be connected to a local memory comprising a number of memory devices 704. In at least one embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 710 interconnect enables systems to scale and include one or more PPUs 700 combined with one or more CPUs, supports cache coherence between the PPUs 700 and CPUs, and CPU mastering. Data and/or commands may be transmitted by the NVLink 710 through the hub 730 to/from other units of the PPU 700 such as one or more copy engines, a video encoder, a video decoder, a power management unit, etc. (not explicitly shown).

The I/O unit 705 may be configured to transmit and receive communications (e.g., commands, data, etc.) from a host processor (not shown) over the interconnect 702. The I/O unit 705 may communicate with the host processor directly via the interconnect 702 or through one or more intermediate devices such as a memory bridge. In at least one embodiment, the I/O unit 705 may communicate with one or more other processors, such as one or more the PPUs 700 via the interconnect 702. In at least one embodiment, the I/O unit 705 implements a Peripheral Component Interconnect Express (PCIe) interface for communications over a PCIe bus and the interconnect 702 is a PCIe bus. In at least one embodiment, the I/O unit 705 may implement other types of well-known interfaces for communicating with external devices.

The I/O unit 705 decodes packets received via the interconnect 702. In at least one embodiment, the packets represent commands configured to cause the PPU 700 to perform various operations. The I/O unit 705 transmits the decoded commands to various other units of the PPU 700 as the commands may specify. For example, some commands may be transmitted to the front end unit 715. Other commands may be transmitted to the hub 730 or other units of the PPU 700 such as one or more copy engines, a video encoder, a video decoder, a power management unit, etc. (not explicitly shown). In other words, the I/O unit 705 may be configured to route communications between and among the various logical units of the PPU 700.

In at least one embodiment, a program executed by the host processor encodes a command stream in a buffer that provides workloads to the PPU 700 for processing. A workload may comprise several instructions and data to be processed by those instructions. The buffer may be a region in a memory that is accessible (e.g., read/write) by both the host processor and the PPU 700. For example, the I/O unit 705 may be configured to access the buffer in a system memory connected to the interconnect 702 via memory requests transmitted over the interconnect 702. In at least one embodiment, the host processor writes the command stream to the buffer and then transmits a pointer to the start of the command stream to the PPU 700. The front end unit 715 receives pointers to one or more command streams. The front end unit 715 manages the one or more streams, reading commands from the streams and forwarding commands to the various units of the PPU 700.

The front end unit 715 is coupled to a scheduler unit 720 that configures the various GPCs 750 to process tasks defined by the one or more streams. The scheduler unit 720 is configured to track state information related to the various tasks managed by the scheduler unit 720. The state may indicate which GPC 750 a task is assigned to, whether the task is active or inactive, a priority level associated with the task, and so forth. The scheduler unit 720 manages the execution of a plurality of tasks on the one or more GPCs 750.

The scheduler unit 720 is coupled to a work distribution unit 725 that is configured to dispatch tasks for execution on the GPCs 750. The work distribution unit 725 may track a number of scheduled tasks received from the scheduler unit 720. In at least one embodiment, the work distribution unit 725 manages a pending task pool and an active task pool for each of the GPCs 750. The pending task pool may comprise a number of slots (e.g., 32 slots) that contain tasks assigned to be processed by a particular GPC 750. The active task pool may comprise a number of slots (e.g., 4 slots) for tasks that are actively being processed by the GPCs 750. As a GPC 750 finishes the execution of a task, that task may be evicted from the active task pool for the GPC 750 and one of the other tasks from the pending task pool is selected and scheduled for execution on the GPC 750. If an active task has been idle on the GPC 750, such as while waiting for a data dependency to be resolved, then the active task may be evicted from the GPC 750 and returned to the pending task pool while another task in the pending task pool is selected and scheduled for execution on the GPC 750.

The work distribution unit 725 communicates with the one or more GPCs 750 via XBar 770. The XBar 770 is an interconnect network that couples many of the units of the PPU 700 to other units of the PPU 700. For example, the XBar 770 may be configured to couple the work distribution unit 725 to a particular GPC 750. Although not shown explicitly, one or more other units of the PPU 700 may also be connected to the XBar 770 via the hub 730.

The tasks are managed by the scheduler unit 720 and dispatched to a GPC 750 by the work distribution unit 725. The GPC 750 is configured to process the task and generate results. The results may be consumed by other tasks within the GPC 750, routed to a different GPC 750 via the XBar 770, or stored in the memory 704. The results can be written to the memory 704 via the partition units 780, which may implement a memory interface for reading and writing data to/from the memory 704. The results can be transmitted to another PPU 700 or CPU via the NVLink 710. In at least one embodiment, the PPU 700 includes a number U of partition units 780 that is equal to the number of separate and distinct memory devices 704 coupled to the PPU 700.

In at least one embodiment, a host processor executes a driver kernel that implements an application programming interface (API) that enables one or more applications executing on the host processor to schedule operations for execution on the PPU 700. In at least one embodiment, multiple compute applications are simultaneously executed by the PPU 700 and the PPU 700 provides isolation, quality of service (QoS), and independent address spaces for the multiple compute applications. An application may generate instructions (e.g., API calls) that cause the driver kernel to generate one or more tasks for execution by the PPU 700. The driver kernel may output tasks to one or more streams being processed by the PPU 700. Each task may comprise one or more groups of related threads, wherein may be referred to as a warp. In at least one embodiment, a warp comprises 32 related threads that may be executed in parallel. Cooperating threads may refer to a plurality of threads including instructions to perform the task and that may exchange data through shared memory.

Figure 8A:
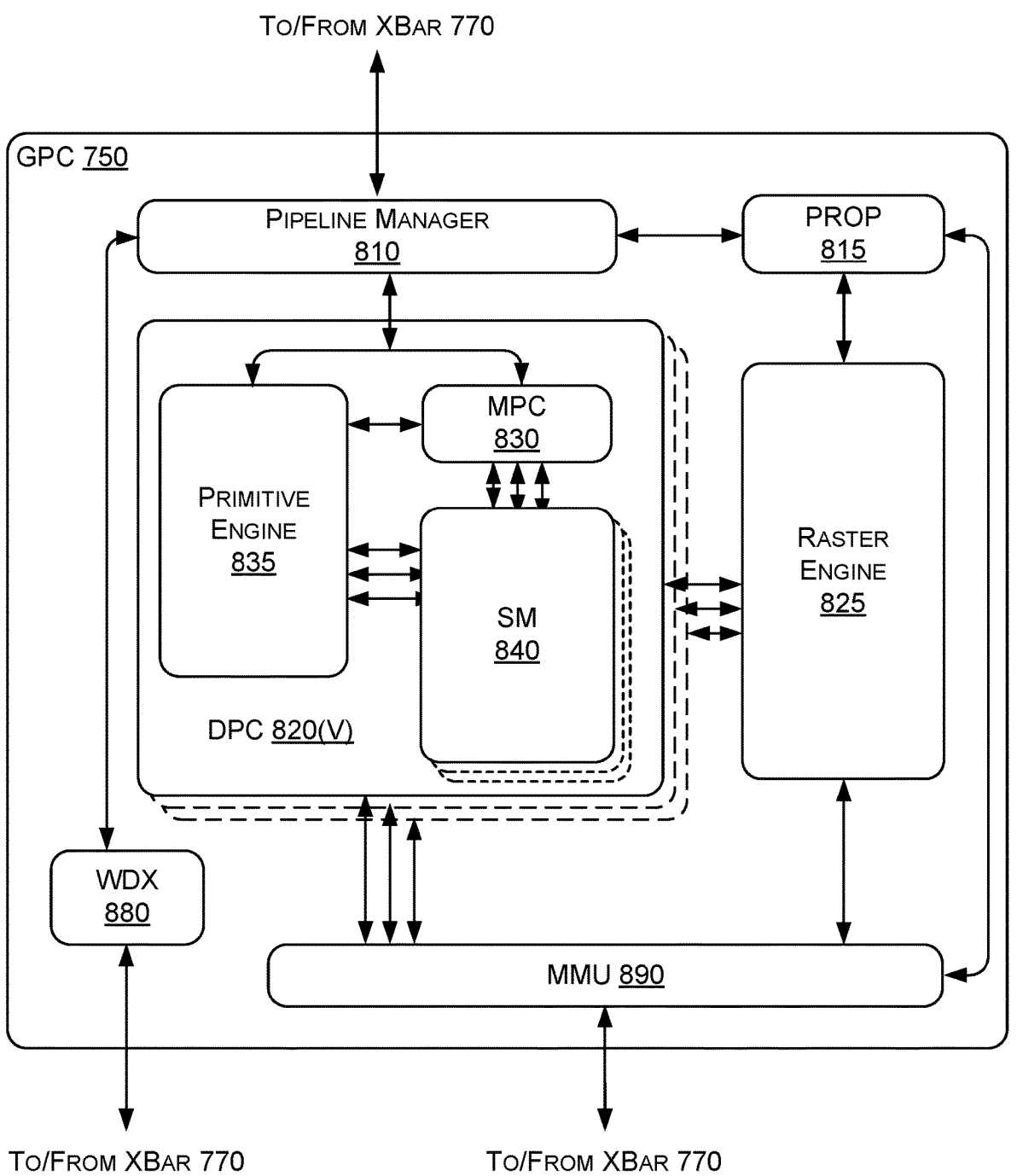
FIG. 8A illustrates an example general processing cluster within the parallel processing unit of FIG. 7 suitable for use in implementing at least some embodiments of the present disclosure.

FIG. 8A illustrates an example GPC 750 of the PPU 700 of FIG. 7 suitable for use in implementing at least some embodiments of the present disclosure. As shown in FIG. 8A, each GPC 750 may include a number of hardware units for processing tasks. In at least one embodiment, each GPC 750 includes a pipeline manager 810, a pre-raster operations unit (PROP) 815, a raster engine 825, a work distribution crossbar (WDX) 880, a memory management unit (MMU) 890, and one or more Data Processing Clusters (DPCs) 820. It will be appreciated that the GPC 750 of FIG. 8A may include other hardware units in lieu of or in addition to the units shown in FIG. 8A.

In at least one embodiment, the operation of the GPC 750 is controlled by the pipeline manager 810. The pipeline manager 810 manages the configuration of the one or more DPCs 820 for processing tasks allocated to the GPC 750. In at least one embodiment, the pipeline manager 810 may configure at least one of the one or more DPCs 820 to implement at least a portion of a graphics rendering pipeline. For example, a DPC 820 may be configured to execute a vertex shader program on the programmable streaming multiprocessor (SM) 840. The pipeline manager 810 may also be configured to route packets received from the work distribution unit 725 to the appropriate logical units within the GPC 750. For example, some packets may be routed to fixed function hardware units in the PROP 815 and/or raster engine 825 while other packets may be routed to the DPCs 820 for processing by the primitive engine 835 or the SM 840. In at least one embodiment, the pipeline manager 810 may configure at least one of the one or more DPCs 820 to implement a neural network model and/or a computing pipeline.

The PROP unit 815 may be configured to route data generated by the raster engine 825 and the DPCs 820 to a Raster Operations (ROP) unit. The PROP unit 815 may also be configured to perform optimizations for color blending, organizing pixel data, performing address translations, and the like.

The raster engine 825 may include a number of fixed function hardware units configured to perform various raster operations. In at least one embodiment, the raster engine 825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 825 comprises fragments to be processed, for example, by a fragment shader implemented within a DPC 820.

Each DPC 820 included in the GPC 750 includes an M-Pipe Controller (MPC) 830, a primitive engine 835, and one or more SMs 840. The MPC 830 controls the operation of the DPC 820, routing packets received from the pipeline manager 810 to the appropriate units in the DPC 820. For example, packets associated with a vertex may be routed to the primitive engine 835, which is configured to fetch vertex attributes associated with the vertex from the memory 704. In contrast, packets associated with a shader program may be transmitted to the SM 840.

The SM 840 comprises a programmable streaming processor that is configured to process tasks represented by a number of threads. Each SM 840 is multi-threaded and configured to execute a plurality of threads (e.g., 32 threads) from a particular group of threads concurrently. In at least one embodiment, the SM 840 implements a SIMD (Single-Instruction, Multiple-Data) architecture where each thread in a group of threads (e.g., a warp) is configured to process a different set of data based on the same set of instructions. All threads in the group of threads execute the same instructions. In at least one embodiment, the SM 840 implements a SIMT (Single-Instruction, Multiple Thread) architecture where each thread in a group of threads is configured to process a different set of data based on the same set of instructions, but where individual threads in the group of threads are allowed to diverge during execution. In at least one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

The MMU 890 may provide an interface between the GPC 750 and the partition unit 780. The MMU 890 may provide translation of virtual addresses into physical addresses, memory protection, and arbitration of memory requests. In at least one embodiment, the MMU 890 provides one or more translation lookaside buffers (TLBs) for performing translation of virtual addresses into physical addresses in the memory 704.

Figure 8B:
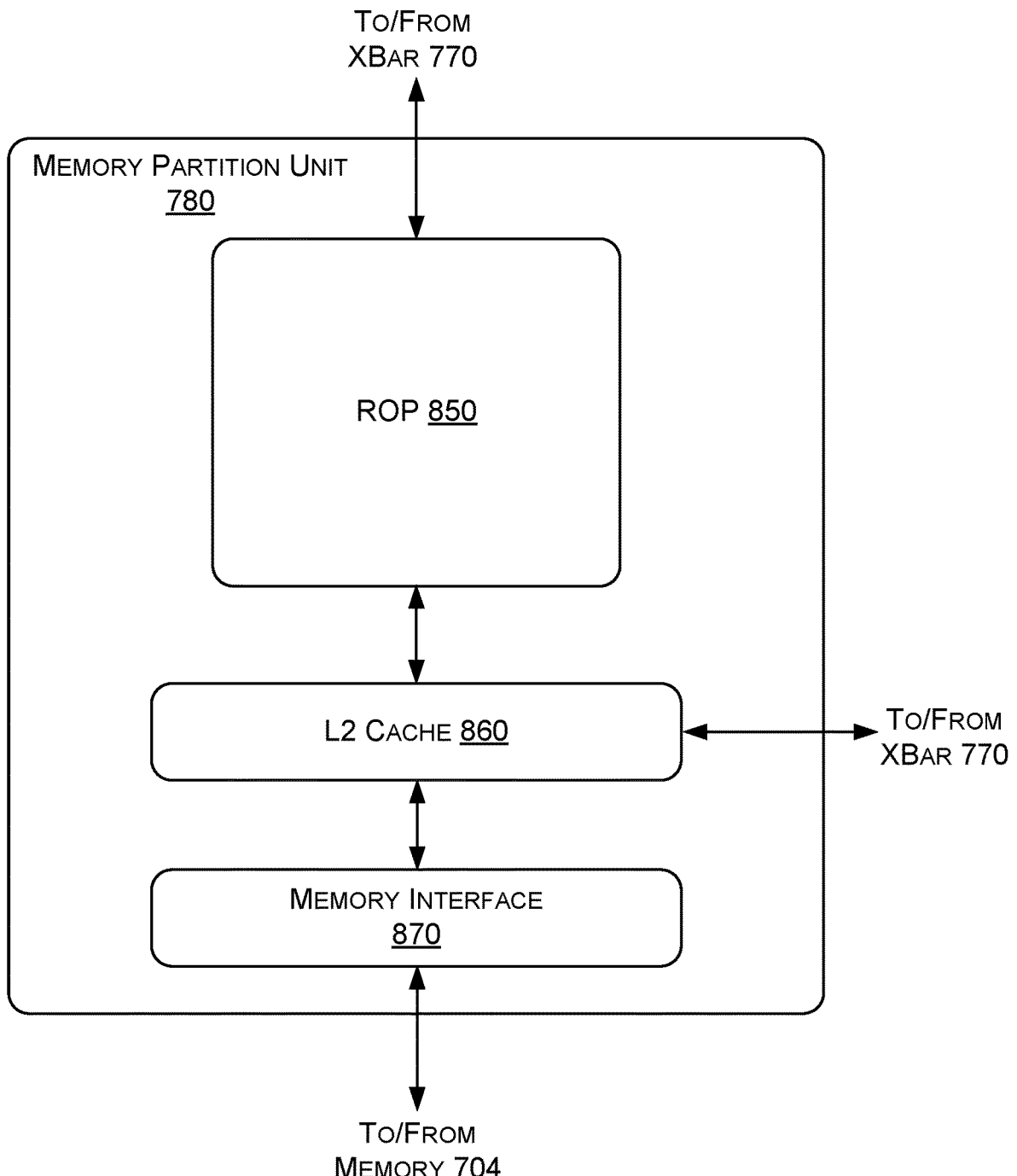
FIG. 8B illustrates an example memory partition unit of the parallel processing unit of FIG. 7 suitable for use in implementing at least some embodiments of the present disclosure.

FIG. 8B illustrates an example memory partition unit 780 of the PPU 700 of FIG. 7 suitable for use in implementing at least some embodiments of the present disclosure. As shown in FIG. 8B, the memory partition unit 780 includes a Raster Operations (ROP) unit 850, a level two (L2) cache 860, and a memory interface 870. The memory interface 870 may be coupled to the memory 704. Memory interface 870 may implement 32, 64, 128, 1024-bit data buses, or the like, for high-speed data transfer. In at least one embodiment, the PPU 700 incorporates U memory interfaces 870, one memory interface 870 per pair of partition units 780, where each pair of partition units 780 is connected to a corresponding memory device 704. For example, the PPU 700 may be connected to up to Y memory devices 704, such as high bandwidth memory stacks or graphics double-data-rate, version 5, synchronous dynamic random access memory, or other types of persistent storage.

In at least one embodiment, the memory interface 870 implements an HBM2 memory interface and Y equals half U. In at least one embodiment, the HBM2 memory stacks are located on the same physical package as the PPU 700, providing substantial power and area savings compared with conventional GDDR5 SDRAM systems. In at least one embodiment, each HBM2 stack includes four memory dies and Y equals 4, with HBM2 stack including two 128-bit channels per die for a total of 8 channels and a data bus width of 1024 bits.

In at least one embodiment, the memory 704 supports Single-Error Correcting Double-Error Detecting (SECDED) Error Correction Code (ECC) to protect data. ECC provides high reliability for compute applications that are sensitive to data corruption. Reliability is especially important in large-scale cluster computing environments where the PPUs 700 process very large datasets and/or run applications for extended periods.

In at least one embodiment, the PPU 700 implements a multi-level memory hierarchy. In at least one embodiment, the memory partition unit 780 supports a unified memory to provide a single unified virtual address space for CPU and PPU 700 memory, enabling data sharing between virtual memory systems. In at least one embodiment the frequency of accesses by a PPU 700 to memory located on other processors is traced to ensure that memory pages are moved to the physical memory of the PPU 700 that is accessing the pages more frequently. In at least one embodiment, the NVLink 710 supports address translation services allowing the PPU 700 to directly access a CPU's page tables and providing full access to CPU memory by the PPU 700.

In at least one embodiment, copy engines transfer data between multiple PPUs 700 or between PPUs 700 and CPUs. The copy engines can generate page faults for addresses that are not mapped into the page tables. The memory partition unit 780 can then service the page faults, mapping the addresses into the page table, after which the copy engine can perform the transfer. With hardware page faulting, addresses can be passed to the copy engines without worrying if the memory pages are resident, and the copy process is transparent.

Data from the memory 704 or other system memory may be fetched by the memory partition unit 780 and stored in the L2 cache 860, which is located on-chip and is shared between the various GPCs 750. As shown, each memory partition unit 780 includes a portion of the L2 cache 860 associated with a corresponding memory device 704. Lower level caches may then be implemented in various units within the GPCs 750. For example, each of the SMs 840 may implement a level one (L1) cache. The L1 cache is private memory that may be dedicated to a particular SM 840. Data from the L2 cache 860 may be fetched and stored in each of the L1 caches for processing in the functional units of the SMs 840. The L2 cache 860 is coupled to the memory interface 870 and the XBar 770.

The ROP unit 850 performs graphics raster operations related to pixel color, such as color compression, pixel blending, and the like. The ROP unit 850 also implements depth testing in conjunction with the raster engine 825, receiving a depth for a sample location associated with a pixel fragment from the culling engine of the raster engine 825. The depth is tested against a corresponding depth in a depth buffer for a sample location associated with the fragment. If the fragment passes the depth test for the sample location, then the ROP unit 850 updates the depth buffer and transmits a result of the depth test to the raster engine 825. It will be appreciated that the number of partition units 780 may be different than the number of GPCs 750 and, therefore, each ROP unit 850 may be coupled to each of the GPCs 750. The ROP unit 850 may track packets received from the different GPCs 750 and determine which GPC 750 that a result generated by the ROP unit 850 is routed to through the Xbar 770. Although the ROP unit 850 is included within the memory partition unit 780 in FIG. 8B, in other examples, the ROP unit 850 may be outside of the memory partition unit 780. For example, the ROP unit 850 may reside in the GPC 750 or another unit.

Figure 9A:
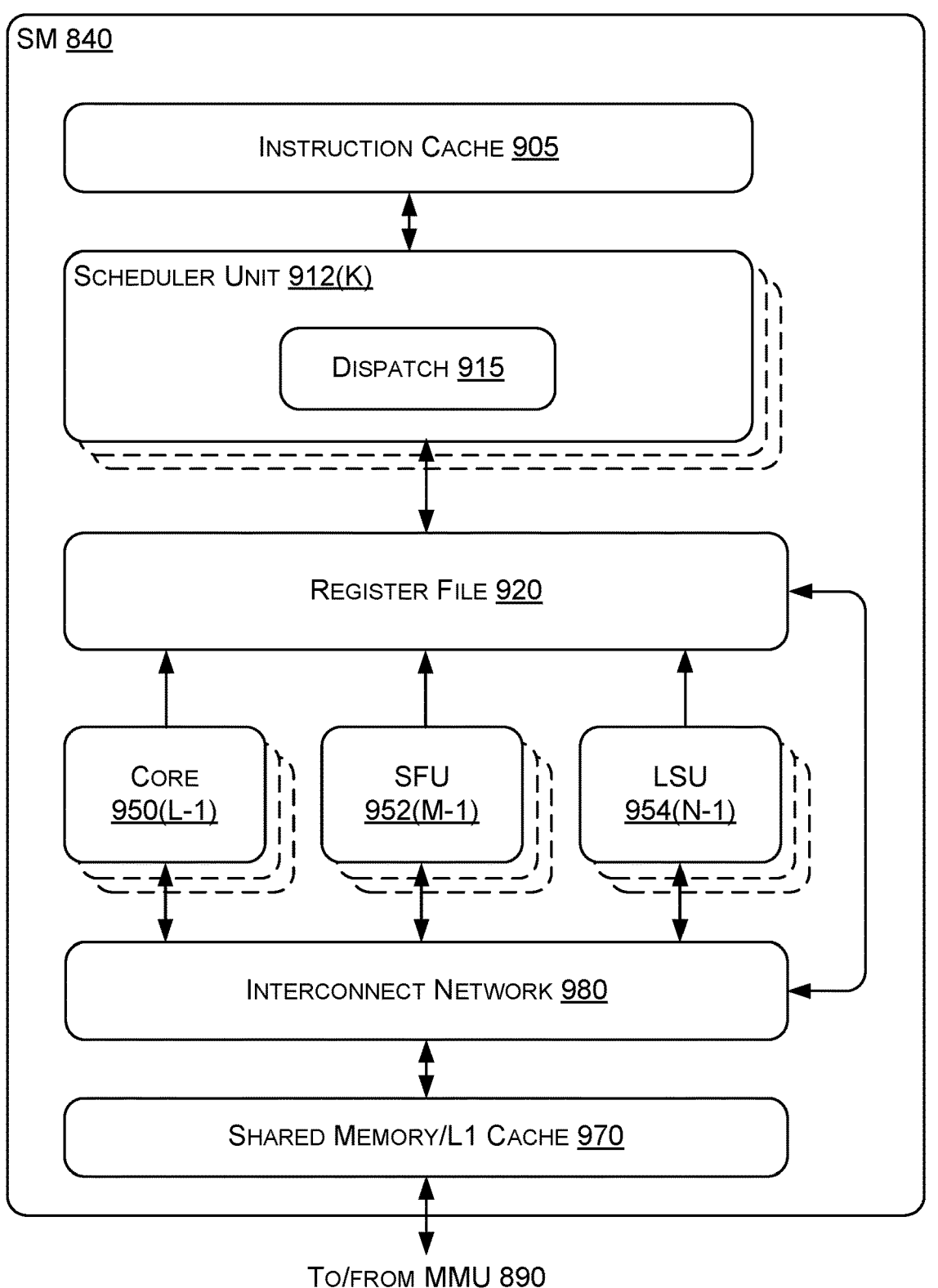
FIG. 9A illustrates an example of the streaming multi-processor of FIG. 8A suitable for use in implementing at least some embodiments of the present disclosure.

FIG. 9A illustrates an example of the streaming multi-processor 840 of FIG. 8A suitable for use in implementing at least some embodiments of the present disclosure. As shown in FIG. 9A, the SM 840 includes an instruction cache 905, one or more scheduler units 912, a register file 920, one or more processing cores 950, one or more special function units (SFUs) 952, one or more load/store units (LSUs) 954, an interconnect network 980, and a shared memory/L1 cache 970.

As described herein, the work distribution unit 725 dispatches tasks for execution on the GPCs 750 of the PPU 700. The tasks may be allocated to a particular DPC 820 within a GPC 750 and, if the task is associated with a shader program, the task may be allocated to an SM 840. The scheduler unit 912 may receive the tasks from the work distribution unit 725 and manage instruction scheduling for one or more thread blocks assigned to the SM 840. The scheduler unit 912 may schedule thread blocks for execution as warps of parallel threads, where each thread block is allocated at least one warp. In at least one embodiment, each warp executes 32 threads. The scheduler unit 912 may manage a plurality of different thread blocks, allocating the warps to the different thread blocks and then dispatching instructions from the plurality of different cooperative groups to the various functional units (e.g., cores 950, SFUs 952, and LSUs 954) during each clock cycle.

Cooperative Groups may refer to a programming model for organizing groups of communicating threads that allows developers to express the granularity at which threads are communicating, enabling the expression of richer, more efficient parallel decompositions. Cooperative launch APIs may support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 915 may be configured to transmit instructions to one or more of the functional units. In at least one embodiment, the scheduler unit 912 includes two dispatch units 915 that enable two different instructions from the same warp to be dispatched during each clock cycle. In at least embodiment, each scheduler unit 912 may include a single dispatch unit 915 or additional dispatch units 915.

Each SM 840 may include a register file 920 that provides a set of registers for the functional units of the SM 840. In at least one embodiment, the register file 920 is divided between each of the functional units such that each functional unit is allocated a dedicated portion of the register file 920. In at least one embodiment, the register file 920 is divided between the different warps being executed by the SM 840. The register file 920 provides temporary storage for operands connected to the data paths of the functional units.

Each SM 840 may include L processing cores 950. In at least one embodiment, the SM 840 includes a large number (e.g., 128, etc.) of distinct processing cores 950. Each core 950 may include a fully-pipelined, single-precision, double-precision, and/or mixed precision processing unit that includes a floating point arithmetic logic unit and an integer arithmetic logic unit. In at least one embodiment, the floating point arithmetic logic units implement the IEEE 754-2008 standard for floating point arithmetic. In at least one embodiment, the cores 950 include 64 single-precision (32-bit) floating point cores, 64 integer cores, 32 double-precision (64-bit) floating point cores, and 8 tensor cores.

Tensor cores configured to perform matrix operations, and, in at least one embodiment, one or more tensor cores are included in the cores 950. In particular, the tensor cores may be configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

Training complex neural networks requires massive amounts of parallel computing performance, including floating-point multiplications and additions that are supported by the PPU 700. Inferencing is less compute-intensive than training, being a latency-sensitive process where a trained neural network is applied to new inputs it has not seen before to classify images, translate speech, and infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 700 may form a computing platform capable of delivering performance required for deep neural network-based artificial intelligence and machine learning applications.

In at least one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores may be used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 840 may also include M SFUs 952 that perform special functions (e.g., attribute evaluation, reciprocal square root, and the like). In at least one embodiment, the SFUs 952 may include a tree traversal unit configured to traverse a hierarchical tree data structure. In at least one embodiment, the SFUs 952 may include texture unit configured to perform texture map filtering operations. In at least one embodiment, the texture units are configured to load texture maps (e.g., a 2D array of texels) from the memory 704 and sample the texture maps to produce sampled texture values for use in shader programs executed by the SM 840. In at least one embodiment, the texture maps are stored in the shared memory/L1 cache 870. The texture units implement texture operations such as filtering operations using mip-maps (e.g., texture maps of varying levels of detail). In at least one embodiment, each SM 840 includes two texture units.

Each SM 840 may also include N LSUs 954 that implement load and store operations between the shared memory/ L1 cache 970 and the register file 920. Each SM 840 may include an interconnect network 980 that connects each of the functional units to the register file 920 and the LSU 954 to the register file 920, shared memory/L1 cache 970. In at least one embodiment, the interconnect network 980 is a crossbar that can be configured to connect any of the functional units to any of the registers in the register file 920 and connect the LSUs 954 to the register file and memory locations in shared memory/L1 cache 970.

The shared memory/L1 cache 970 may include an array of on-chip memory that allows for data storage and communication between the SM 840 and the primitive engine 835 and between threads in the SM 840. In at least one embodiment, the shared memory/L1 cache 970 comprises 128 KB of storage capacity and is in the path from the SM 840 to the partition unit 780. The shared memory/L1 cache 970 can be used to cache reads and writes. One or more of the shared memory/L1 cache 970, L2 cache 860, and memory 704 may be backing stores.

Combining data cache and shared memory functionality into a single memory block may provide the best overall performance for both types of memory accesses. The capacity may be usable as a cache by programs that do not use shared memory. For example, if shared memory is configured to use half of the capacity, texture and load/store operations can use the remaining capacity. Integration within the shared memory/L1 cache 970 may enable the shared memory/L1 cache 970 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 7, may be bypassed, creating a much simpler programming model. In the general-purpose parallel computation configuration, the work distribution unit 725 may assign and distribute blocks of threads directly to the DPCs 820. The threads in a block may execute the same program, using a unique thread ID in the calculation to ensure each thread generates unique results, using the SM 840 to execute the program and perform calculations, shared memory/L1 cache 970 to communicate between threads, and the LSU 954 to read and write global memory through the shared memory/L1 cache 970 and the memory partition unit 780. When configured for general purpose parallel computation, the SM 840 can also write commands that the scheduler unit 720 can use to launch new work on the DPCs 820.

The PPU 700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like.

In at least one embodiment, the PPU 700 is embodied on a single semiconductor substrate. In at least one embodiment, the PPU 700 is included in a system-on-a-chip (SoC) along with one or more other devices such as additional PPUs 700, the memory, a reduced instruction set computer (RISC) CPU, a memory management unit (MMU), a digital-to-analog converter (DAC), and the like.

In at least one embodiment, the PPU 700 may be included on a graphics card that includes one or more memory devices 704. The graphics card may be configured to interface with a PCIe slot on a motherboard of a desktop computer. In at least one embodiment, the PPU 700 may be an integrated graphics processing unit (iGPU) or parallel processor included in the chipset of the motherboard.

Example of a Computing System

Systems with multiple GPUs and CPUs are used in a variety of industries as developers expose and use more parallelism in applications such as artificial intelligence computing. High-performance GPU-accelerated systems with tens to many thousands or more of compute nodes are deployed in data centers, research facilities, and supercomputers to solve ever larger problems. As the number of processing devices within the high-performance systems increases, the communication and data transfer mechanisms need to scale to support the increased bandwidth.

Figure 9B:
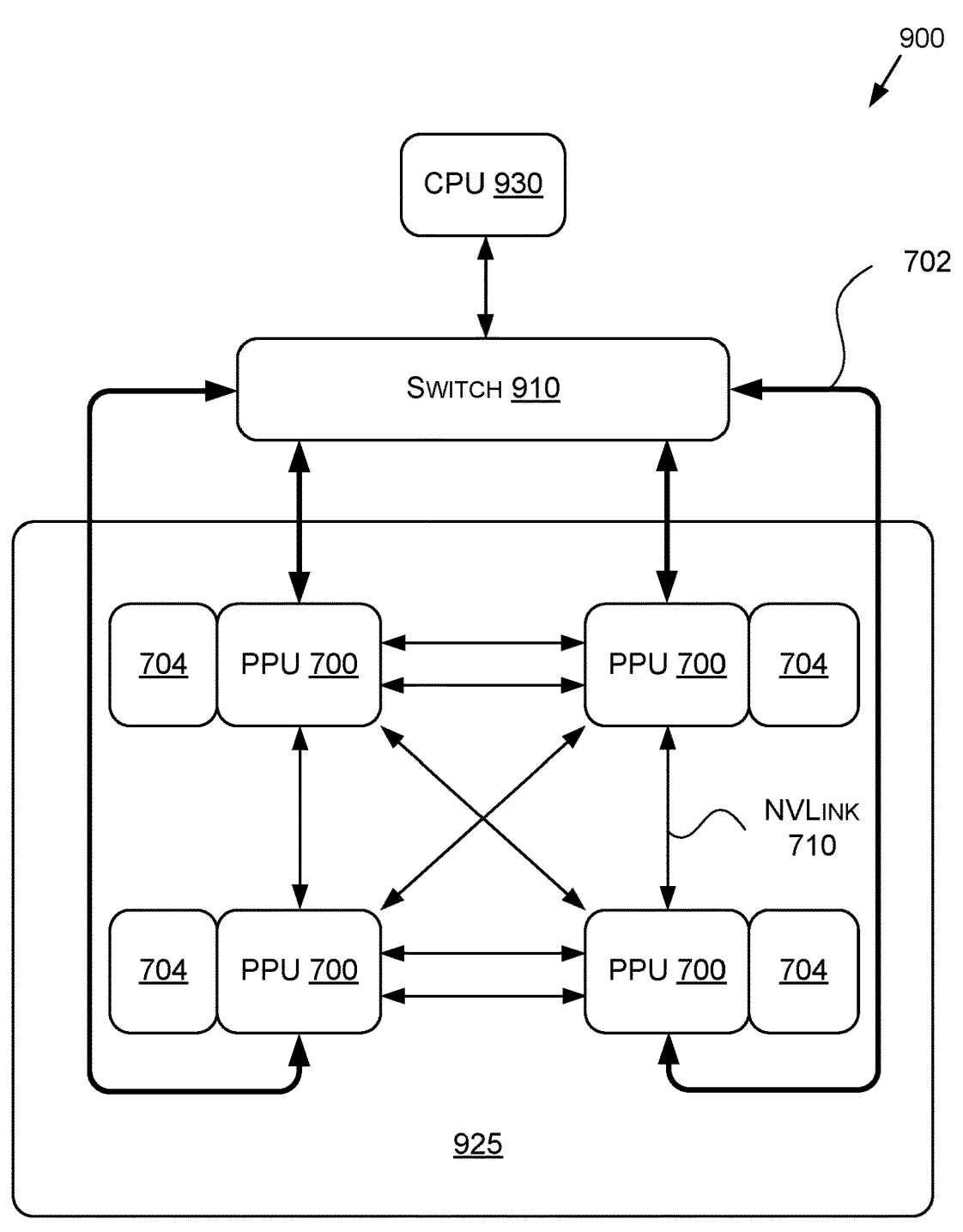
FIG. 9B is an example conceptual diagram of a processing system implemented using the PPU of FIG. 7 suitable for use in implementing at least some embodiments of the present disclosure.

FIG. 9B is an example conceptual diagram of a processing system 900 implemented using the PPU 700 of FIG. 7 suitable for use in implementing at least some embodiments of the present disclosure. The processing system 900 includes a CPU 930, switch 910, and multiple PPUs 700 each and respective memories 704. The NVLink 710 provides high-speed communication links between each of the PPUs 700. Although a particular number of NVLink 710 and interconnect 702 connections are illustrated in FIG. 9B, the number of connections to each PPU 700 and the CPU 930 may vary. The switch 910 interfaces between the interconnect 702 and the CPU 930. The PPUs 700, memories 704, and NVLinks 710 may be situated on a single semiconductor platform to form a parallel processing system 925. In at least one embodiment, the switch 910 supports two or more protocols to interface between various different connections and/or links.

In at least embodiment (not shown), the NVLink 710 provides one or more high-speed communication links between each of the PPUs 700 and the CPU 930 and the switch 910 interfaces between the interconnect 702 and each of the PPUs 700. The PPUs 700, memories 704, and interconnect 702 may be situated on a single semiconductor platform to form a parallel processing module 925. In at least one embodiment (not shown), the interconnect 702 provides one or more communication links between each of the PPUs 700 and the CPU 930 and the switch 910 interfaces between each of the PPUs 700 using the NVLink 710 to provide one or more high-speed communication links between the PPUs 700. In at least one embodiment (not shown), the NVLink 710 provides one or more high-speed communication links between the PPUs 700 and the CPU 930 through the switch 910. In yet at least one embodiment (not shown), the interconnect 702 provides one or more communication links between each of the PPUs 700 directly. One or more of the NVLink 710 high-speed communication links may be implemented as a physical NVLink interconnect or either an on-chip or on-die interconnect using the same protocol as the NVLink 710.

In the context of the present description, a single semiconductor platform may refer to a sole unitary semiconductor-based integrated circuit fabricated on a die or chip. The term single semiconductor platform may also refer to multi-chip modules with increased connectivity which simulate on-chip operation and make substantial improvements over using a conventional bus implementation. Of course, the various circuits or devices may also be situated separately or in various combinations of semiconductor platforms per the desires of the user. Alternately, the parallel processing module 925 may be implemented as a circuit board substrate and each of the PPUs 700 and/or memories 704 may be packaged devices. In at least one embodiment, the CPU 930, switch 910, and the parallel processing module 925 are situated on a single semiconductor platform.

In at least one embodiment, the signaling rate of each NVLink 710 is 20 to 25 Gigabits/second and each PPU 700 includes six NVLink 710 interfaces (as shown in FIG. 9B, five NVLink 710 interfaces are included for each PPU 700). Each NVLink 710 may provide a data transfer rate of 25 Gigabytes/second in each direction, with six links providing 700 Gigabytes/second. The NVLinks 710 can be used exclusively for PPU-to-PPU communication as shown in FIG. 9B, or some combination of PPU-to-PPU and PPU-to-CPU, when the CPU 930 also includes one or more NVLink 710 interfaces.

In at least one embodiment, the NVLink 710 allows direct load/store/atomic access from the CPU 930 to each PPU's 700 memory 704. In at least one embodiment, the NVLink 710 supports coherency operations, allowing data read from the memories 704 to be stored in the cache hierarchy of the CPU 930, reducing cache access latency for the CPU 930. In at least one embodiment, the NVLink 710 includes support for Address Translation Services (ATS), allowing the PPU 700 to directly access page tables within the CPU 930. One or more of the NVLinks 710 may also be configured to operate in a low-power mode.

FIG. 9C illustrates an example system 965 in which the various architecture and/or functionality of the various previous embodiments may be implemented suitable for use in implementing at least some embodiments of the present disclosure.

As shown, a system 965 is provided including at least one central processing unit 930 that is connected to a communication bus 975. The communication bus 975 may be implemented using any suitable protocol, such as PCI (Peripheral Component Interconnect), PCI-Express, AGP (Accelerated Graphics Port), HyperTransport, or any other bus or point-to-point communication protocol(s). The system 965 also includes a main memory 940. Control logic (software) and data are stored in the main memory 940 which may take the form of random access memory (RAM).

The system 965 also includes input devices 960, the parallel processing system 925, and display devices 945, e.g. a conventional CRT (cathode ray tube), LCD (liquid crystal display), LED (light emitting diode), plasma display or the like. User input may be received from the input devices 960, e.g., keyboard, mouse, touchpad, microphone, and the like. Each of the foregoing modules and/or devices may even be situated on a single semiconductor platform to form the system 965. Alternately, the various modules may also be situated separately or in various combinations of semiconductor platforms per the desires of the user.

Further, the system 965 may be coupled to a network (e.g., a telecommunications network, local area network (LAN), wireless network, wide area network (WAN) such as the Internet, peer-to-peer network, cable network, or the like) through a network interface 935 for communication purposes.

The system 965 may also include a secondary storage (not shown). The secondary storage may include, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive may read from and/or writes to a removable storage unit.

Computer programs, or computer control logic algorithms, may be stored in the main memory 940 and/or the secondary storage. Such computer programs, when executed, enable the system 965 to perform various functions. The memory 940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Ray Tracing Pipeline

In at least one embodiment, the PPU 700 comprises a graphics processing unit (GPU). The PPU 700 may be configured to receive commands that specify shader programs for processing graphics data. Graphics data may be defined as a set of primitives such as points, lines, triangles, quads, triangle strips, and the like. A primitive may include data that specifies a number of vertices for the primitive (e.g., in a model-space coordinate system) as well as attributes associated with each vertex of the primitive. The PPU 700 may be configured to process the graphics primitives to generate a frame buffer (e.g., pixel data for each of the pixels of the display).

An application may write model data for a scene (e.g., a collection of vertices and attributes) to a memory such as a system memory or memory 704. The model data may define each of the objects that may be visible on a display. The application may then make an API call to the driver kernel that requests the model data to be rendered and displayed. The driver kernel may read the model data and write commands to the one or more streams to perform operations to process the model data. The commands may reference different shader programs to be implemented on the SMs 840 of the PPU 700. For example, different SMs 840 may be configured to execute different shader programs.

In at least one embodiment, the model data may be processed to perform one or more ray tracing operations, such as real-time tray tracing, to render the model data to a frame buffer. The contents of the frame buffer may be transmitted to a display controller for display on a display device. Ray tracing may refer to any of a variety of techniques for modeling or simulating light transport and/or other aspects of an environment, for example, for use in generating digital images or otherwise simulating the environment. Thus, while certain embodiments may be described with respect to light transport simulation, they may be applicable to simulating, modeling, and/or measuring any of a variety of aspects of an environment. Non-limiting examples of ray tracing include ray casting, recursive ray tracing, distribution ray tracing, photon mapping, and path tracing.

Ray tracing may be used to simulate a variety of optical effects—such as shadows, reflections, refractions, scattering phenomenon, ambient occlusions, global illuminations, or dispersion phenomenon (such as chromatic aberration). Ray tracing may involve generating ray-traced samples by casting rays in a virtual environment to sample lighting and/or other environmental conditions for pixels. The ray traced samples may be combined and used to determine pixel colors for an image. In at least one embodiment, to conserve computing resources, the lighting conditions may be sparsely sampled, resulting in noisy render data. Temporal accumulation may be used to increase the effective sample count by using information from previous frames. To produce a final render that approximates a render of a fully sampled scene, one or more denoising filters may by be applied to the noisy render data to reduce noise.

Many ray tracing algorithms may cast or shoot rays from a virtual camera, or eye, through a 2D viewing plane (e.g., a pixel plane) out into a 3D scene which may include one or more light sources. Some rays may directly reach the viewing plane from a light source, some may be blocked by an object in the scene causing shadows, and some may reflect or refract off an object before reaching the viewing plane. When the rays intersect objects, the color and lighting information at the points of intersection on object surfaces may contribute to various pixel color and illumination levels of pixels of the viewing plane. Different objects may have different surface properties that can cause them to reflect, refract, or absorb light in different ways, which may be accounted for in ray tracing. Rays may reflect off objects and hit other objects, or travel through the surfaces of transparent objects before reaching a light source, and the color and lighting information from all the intersected objects may contribute to the final pixel colors.

FIG. 10 illustrates an example ray tracing pipeline 1000 suitable for use in implementing at least some embodiments of the present disclosure. By way of example, and not limitations, the ray tracing pipeline 1000 may be implemented by the PPU 700 of FIG. 7, in accordance with at least one embodiment. The ray tracing pipeline 1000 may include processing steps implemented to generate 2D computer-generated images from 3D geometry data using one or more ray tracing techniques.

In at least one embodiment, the ray tracing pipeline 1000 may be constructed using one or more ray generation shaders 1002, one or more any hit shaders 1004, one or more intersection shaders 1006, one or more miss shaders 1008, and/or one or more closest hit shaders 1010.

The ray tracing pipeline 1000 may be implemented via an application executed by a host processor, such as a CPU. In at least one embodiment, a device driver may implement an application programming interface (API) that defines various functions that can be used by an application in order to generate graphical data for display. The device driver may refer to a software program that includes instructions that control the operation of the PPU 700, or other PPU used to implement the ray tracing pipeline 1000. The API may provide an abstraction for a programmer that lets a programmer use specialized graphics hardware, such as the PPU 700, to generate the graphical data without requiring the programmer to use the specific instruction set for the PPU 700. The application may include an API call that is routed to the device driver for the PPU 700. The device driver may interpret the API call and perform various operations to respond to the API call. In at least one embodiment, the device driver performs operations by executing instructions on the CPU. In at least one embodiment, the device driver performs operations, at least in part, by launching operations on the PPU 700 using an input/output interface between the CPU and the PPU 700. In at least one embodiment, the device driver is configured to implement the ray tracing pipeline 1000 using the hardware of the PPU 700.

Various programs may be executed within the PPU 700 in order to implement the various stages of the ray tracing pipeline 1000. For example, the device driver may launch a kernel on the PPU 700 to execute a stage implementing a ray generation shader 1002 on an SM 840 (or multiple SMs 840). The device driver (or the initial kernel executed by the PPU 700) may also launch other kernels on the PPU 700 to execute other stages of the ray tracing pipeline 1000.

The ray generation shader 1002 may be the first shader involved in ray tracing dispatch. The ray generation shader 1002 may call a High Level Shader Language (HLSL) function called TraceRay( ). This TraceRay( ) function may cast a single ray into the scene to search for intersections, which may trigger other shaders in the process. In at least one embodiment, the ray generation shader 1002 may call TraceRay( ) any number of times.

An any hit shader 1004 and an intersection shader 1006 may be invoked whenever TraceRay( ) finds a potential intersection between the ray and the scene. The intersection shader 1006 may determine whether the ray intersects an individual geometric primitive—for example a sphere, a subdivision surface, a triangle, or other form of primitive. Once an intersection is found, the any hit shader 1004 may be used to process the intersection further or potentially discard the intersection. An any hit shader 1004 may, by way of example and not limitation, use alpha testing by performing a texture lookup and deciding based on the texel's value whether or not to discard an intersection.

Once TraceRay( ) has completed the search for ray-scene intersections, either a miss shader 1008 or a closest hit shader 1010 may be invoked, depending on the outcome of the search. The closest hit shader 1010 may perform most shading operations, such as, material evaluation, texture lookups, and so on. The miss shader 1008 may be used to implement environment lookups, for example. In at least one embodiment, one or more of the closest hit shader 1010 or the miss shader 1008 may recursively trace rays by calling TraceRay( ) themselves.

The ray tracing pipeline 1000 constructed from any of the various shaders described herein may define a single-ray programming model. In at least one embodiment, each thread of the PPU 700, and/or other PPU used to implement the ray tracing pipeline 1000, may handle one ray at a time. In at least one embodiment, each thread cannot communicate with other threads or see other rays currently being processed. This may simplify shader code, while allowing for vendor-specific optimizations using the API.

In at least one embodiment, different shaders and/or shader types may communicate with each other using a ray payload. A ray payload may refer to a user-defined struct that's passed as an INOUT parameter to TraceRay( ). For example, an any hit shader 1004, a closest hit shader 1010, and/or a miss shader 1008 may read from and/or write to the ray payload, and therefore pass back the result of their computations to the caller of TraceRay( ).

In at least one embodiment, a ray generation shader 1002 may trace primary rays, which may include rays being sent into the scene originating from a virtual camera. However, ray generation shaders 1002 are not limited to this functionality. In at least one embodiment, a ray generation shader 1002 may base ray generation on rasterized g-buffer data (e.g., to trace reflections). Using this approach, ray tracing may be used to complement rasterization, rather than replace rasterization.

When using traditional rasterization, only the shaders required by the current object being drawn may have to be active on the PPU. This may allow rasterization pipeline objects to be relatively small, containing a single set of vertex shaders, pixel shaders, etc. In contrast, a ray tracing pipeline 1000 may be used to arbitrarily shoot rays into the scene. This may mean the rays could hit any object or many objects in the scene. Therefore, it may be the case that all shaders for all objects could potentially be hit and therefore it may be desirable for the shaders to all be resident on the PPU and ready for execution.

In at least one embodiment, a state object may be used to group shaders together for execution. At a high level, a state object of a ray tracing pipeline 1000 may be seen as a binary executable resulting from a link step across all the shaders compiled for the scene. The relationship between different shaders may be specified at state object creation. For example, triplets of intersection shaders 1006, any hit shaders 1004, and/or closest hit shaders 1010 may be bundled into hit groups. The application may specify the state object of the ray tracing pipeline 1000 to be executed when calling a DispatchRays( ) function on a command list. A Dispath-Rays( ) function may invoke a ray generation shader 1002 for each pixel for an image. In at least one embodiment, an application may create any number of state objects for a ray tracing pipeline 1000 and may reuse precompiled shaders for this purpose.

Figure 11:
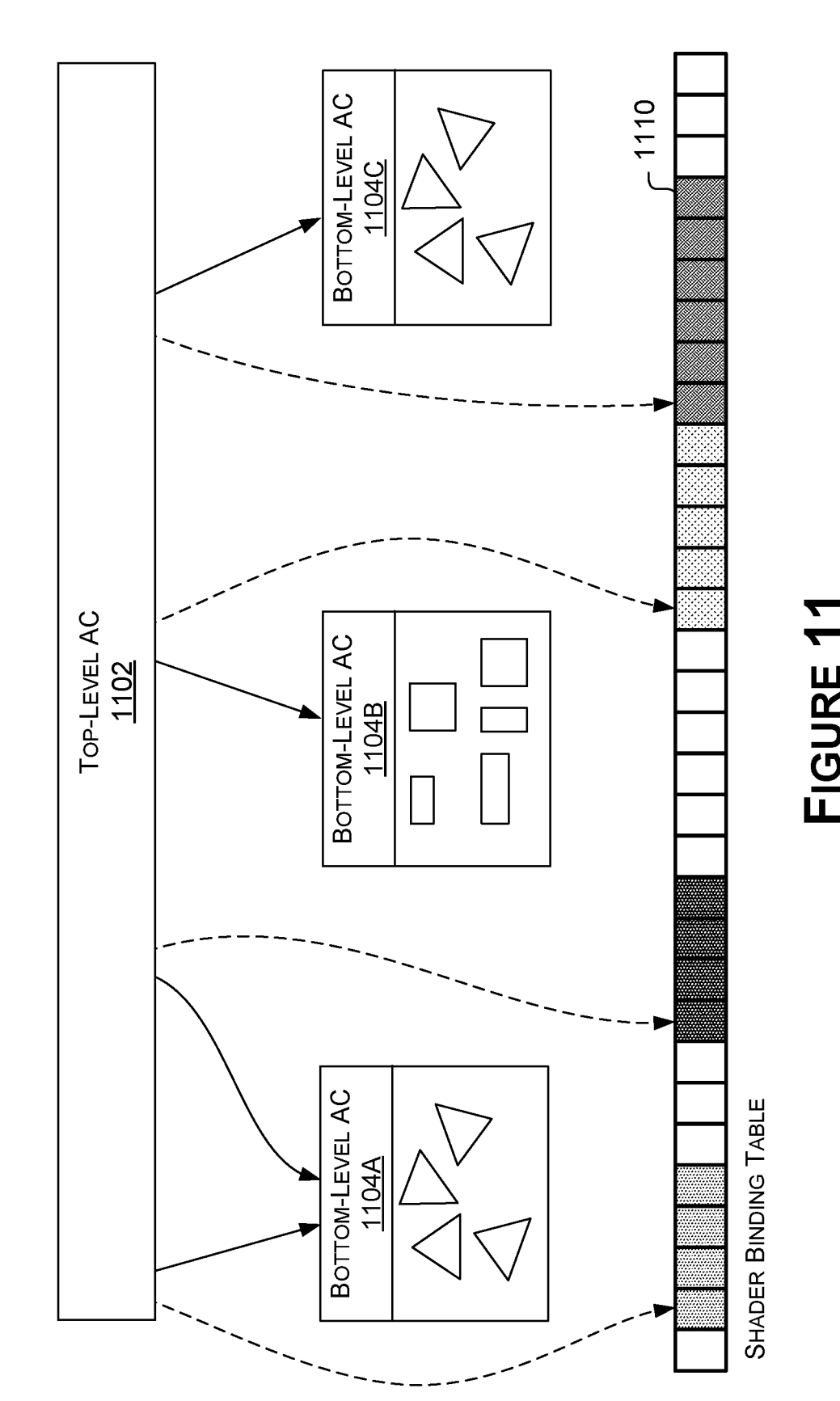
FIG. 11 illustrates an example acceleration structure suitable for use in implementing at least some embodiments of the present disclosure.

Referring now to FIG. 11, FIG. 11 illustrates an example acceleration structure 1100 suitable for use in implementing at least some embodiments of the present disclosure. The acceleration structure 1100 includes one or more top-level acceleration structures, such as a top-level acceleration structure 1102, and one or more bottom-level acceleration structures, such as bottom-level acceleration structures 1104A, 1104B, and 1104C.

The acceleration structure 1100 may comprise a spatial search data structure used in a ray tracing pipeline 1000 for acceleration structure traversal 1020 to efficiently compute intersections of rays with scene geometry. In at least one embodiment, the application may build an acceleration structure 1100 explicitly using a command list method BuildRaytracingAccelerationStructure( ). In at least one embodiment, the application may optimize an acceleration structure 1100 for different types of content, such as static versus animated content.

A top-level acceleration structure 1102 may be built from one or more references to one or more bottom-level acceleration structures 1104A, 1104B, and/or 1104C. These references may be referred to as instance descriptors. Each instance descriptor may include a transformation matrix to position the instance descriptor in the scene, and an offset into a shader table 1110 (which may also be referred to as a "shader binding table") to locate material information. In at least one embodiment, a top-level acceleration structure 1102 may be used as a scene parameter provided to Trac-eRay( ) in a ray generation shader 1002, and may represent an entry point of the intersection search.

A ray tracing pipeline 1000 may specify the shaders that exist in a scene and an acceleration structure 1100 may specify geometry for the scene. The shader table 1110 may refer to a data structure used to tie the geometry to the shaders. For example, the shader table 1110 may define which shader is associated with which object in the scene. In addition, the shader table 1110 may hold information about the resources accessed by each shader, such as textures, buffers, and constants.

A shader table 1110 may comprise a chunk of PPU memory, which may be managed by the application. The application may be responsible for allocating the resource, filling the shader table 1110 with valid data, transferring it to the PPU, and correctly synchronizing the shader table 1110 with ray tracing dispatches. The application may also maintain multiple shader tables 1110, and, for example, multi-buffer them to update one copy while using another for rendering.

A shader table 1110 may comprise an array of equal-sized shader records. Each shader record may associate a shader (or a hit group) with a set of resources. In at least one embodiment, there may exist one record per geometry object in the scene, and a shader table 1110 may include thousands of entries or more.

Figure 12:
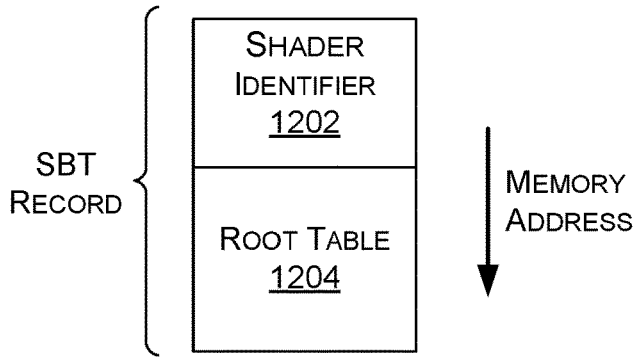
FIG. 12 illustrates an example shader record suitable for use in implementing at least some embodiments of the present disclosure.

Referring now to FIG. 12, FIG. 12 illustrates an example shader record 1200 suitable for use in implementing at least some embodiments of the present disclosure. The shader record 1200 is an example of a shader record that may be included in the shader table 1110 of FIG. 11. The shader record 1200 includes a shader identifier 1202 and a root table 1204.

In at least one embodiment, the shader identifier 1202 may be represented in a beginning portion of the shader record 1200 in memory. The shader identifier 1202 may be an opaque identifier, which the application obtains by querying for the shader identifier 1202 from a compiled shader. The root table 1204 may contain the shader's resources. The layout of the root table 1204 may be defined by the shader's local root signature. The root signature may contain any combination of constants, descriptor tables, and root descriptors. For ray tracing, the application may directly access the root table 1204 in memory (e.g., rather than using "setter" methods), which may allow for efficient updates. In at least one embodiment, a shader table 1110 may be updated from a PPU shader.

As described herein, shader table offsets may be used when building a top-level acceleration structure 1102 from instance descriptors. The system may use these offsets to locate the correct shader record 1200 whenever TraceRay( ) finds an intersection. The system may then bind the resources defined in the shader record 1200 and execute the appropriate shader for the intersected geometry.

Example Computing Device

Figure 13:
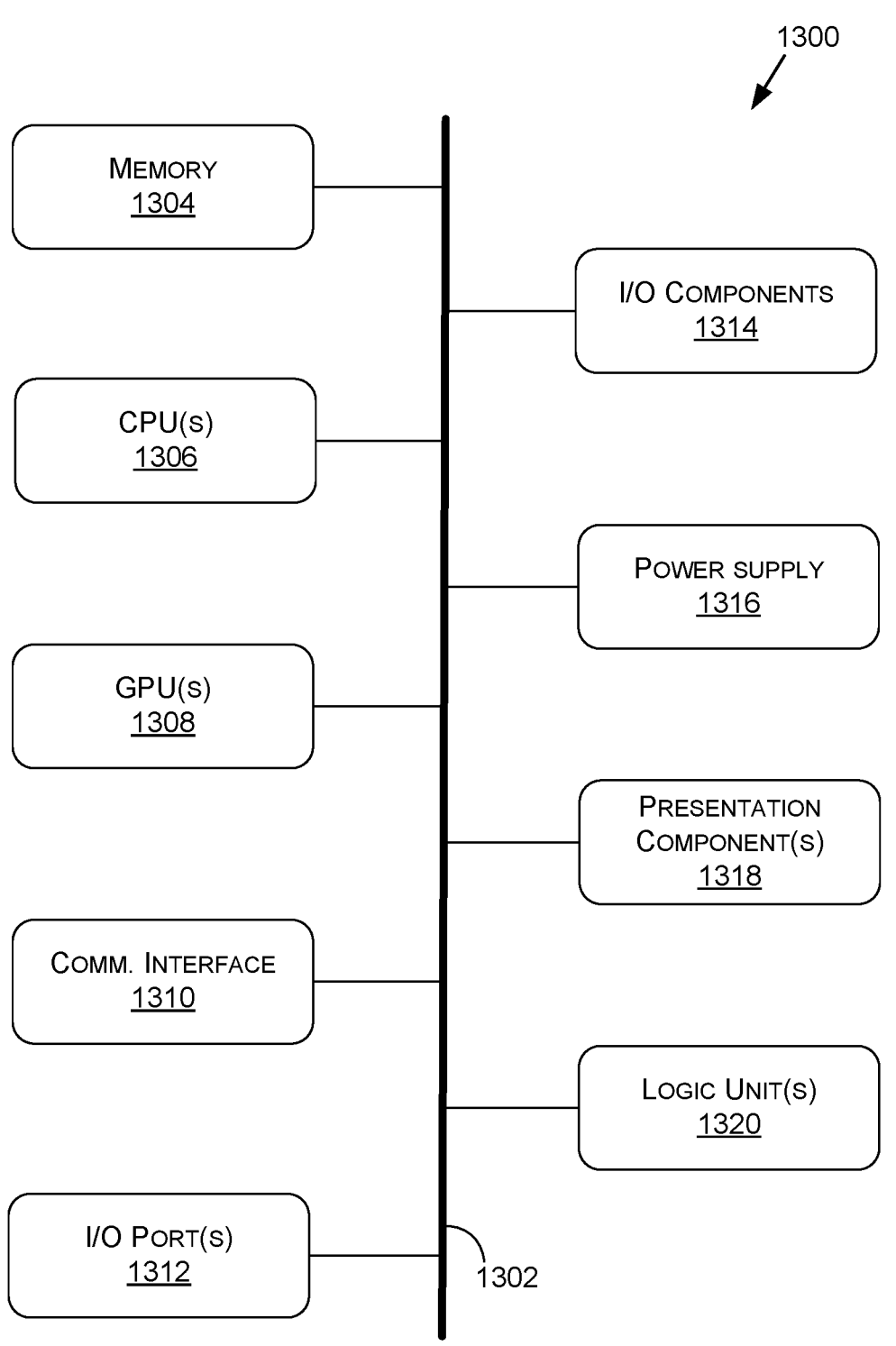
FIG. 13 is a block diagram of an example computing device suitable for use in implementing some embodiments of the present disclosure.

FIG. 13 is a block diagram of an example computing device(s) 1300 suitable for use in implementing at least some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more pups, one or more of the CPUs 1306 may comprise one or more vCPUs, and/or one or more of the logic units 1320 may comprise one or more virtual logic units. As such, a computing device(s)

1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
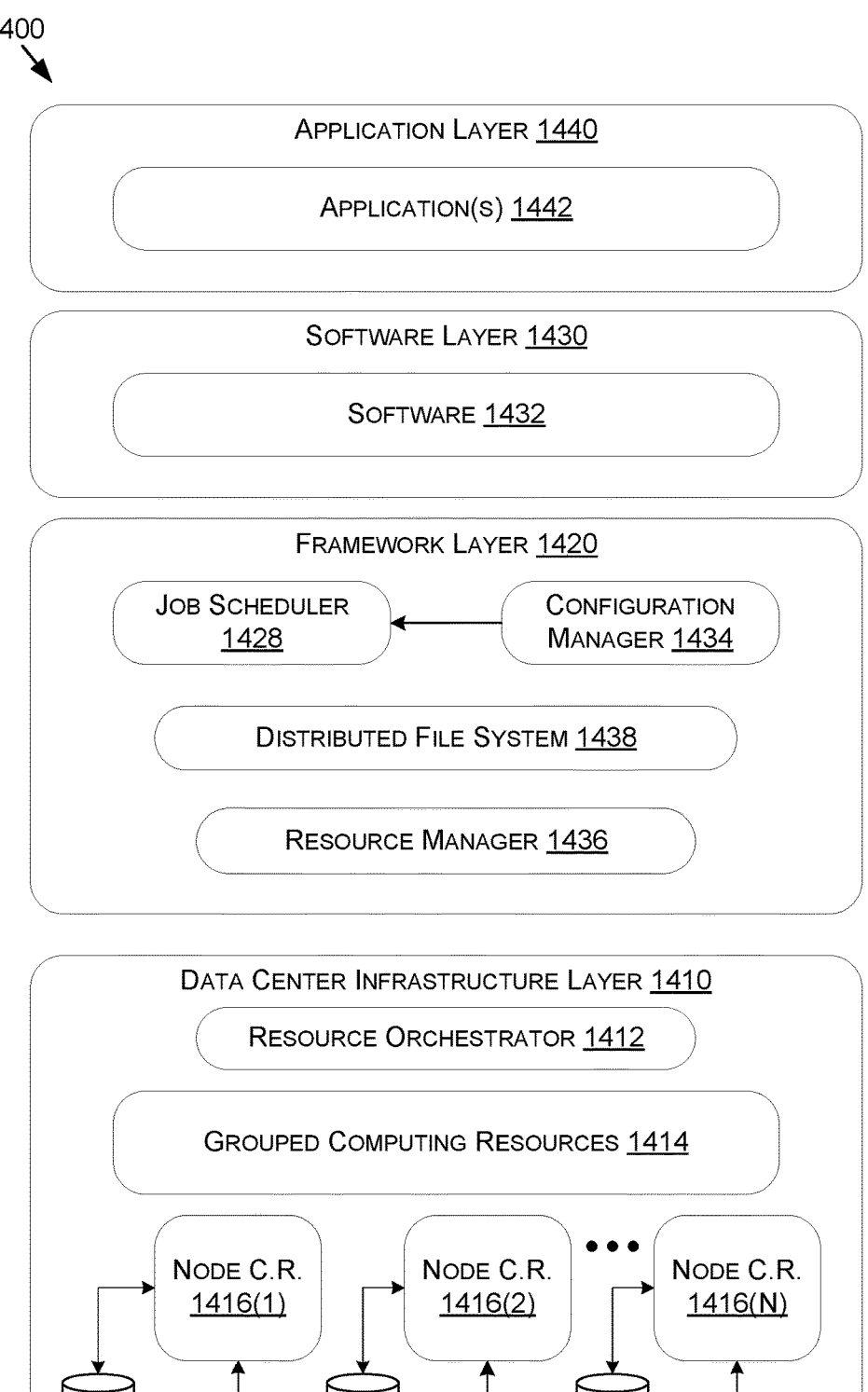
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161(N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1428, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application (s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1428 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1428. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underused and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, at a first node of a plurality of compute nodes, traversal information for a ray in a distributed light transport simulation operation that is processed across the plurality of compute nodes, the plurality of compute nodes corresponding to respective computing environments interconnected by one or more networks;
   intersection testing, at least by the first node, the ray against one or more first partitions stored at the first node from partitions of a scene that are respectively stored amongst the plurality of compute nodes;
   selecting, by the first node, a second node from the plurality of compute nodes based at least on determining the second node is storing one or more second partitions from the partitions;
   based at least on the selecting, verifying, using the traversal information, that the second node has not yet intersection-tested the ray in the distributed light transport simulation operation using the one or more second partitions; and
   based at least on the verifying, providing to the second node over the one or more networks, one or more messages comprising data corresponding to the ray, the one or more messages causing the second node to perform one or more portions of the distributed light transport simulation operation.

2. The method of claim 1, wherein the verifying of the second node is based at least on:
   executing, at the first node, at least a portion of the distributed light transport simulation operation using the traversal information; and
   determining the second node has not yet intersection-tested the ray based at least on the executing.

3. The method of claim 1, wherein the second node includes at least two partitions of the partitions of the scene, the at least two partitions representing respective discrete and non-overlapping spatial units of the scene.

4. The method of claim 1, wherein the traversal information includes a list of one or more nodes from the plurality of compute nodes that have already intersection-tested the ray or one or more nodes from the plurality of compute nodes that have not yet intersection-tested the ray, and the determining the second node is based at least on determining, using the list, that the second node has not yet intersection-tested the ray.

5. The method of claim 1, wherein the selecting of the second node is based at least on:
   intersection testing, at least by the first node, the ray against at least one proxy volume corresponding to the one or more second partitions; and
   identifying at least one intersection between the ray and the at least one proxy volume based at least on the intersection testing.

6. The method of claim 5, wherein a proxy volume of the at least one proxy volume at least partially overlaps spatially with at least one second proxy volume corresponding to at least one second partition of the partitions, the at least one second partition assigned to a third node of the plurality of compute nodes.

7. The method of claim 1, wherein each compute node of the plurality of compute nodes includes a respective processing unit used to perform a respective portion of the distributed light transport simulation operation at the compute node.

8. The method of claim 1, wherein the selecting of the second node is based at least on:

selecting, by the first node, a third node from the plurality of compute nodes based at least on determining the third node is storing one or more third partitions from the partitions;

based at least on the selecting, determining, using the traversal information, that the third node has already intersection-tested the ray in the distributed light transport simulation operation using the one or more second partitions.

9. The method of claim 1, wherein the plurality of compute nodes are associated with proxy volumes indicating the partitions of the scene, a proxy volume of one or more of the proxy volumes that have not yet been intersection-tested using the ray is associated with the second node, and the determining the second node is further based at least on the traversal information indicating the proxy volume is a closest of the one or more of the proxy volumes to a pixel for which the ray is being traced.

10. The method of claim 1, wherein each compute node of the plurality of compute nodes corresponds to a respective computing device of a plurality of computing devices, and the one or more networks communicatively couple the plurality of computing devices.

11. A system comprising:

one or more processing units to execute operations comprising:

intersection testing, at least using a first node of a plurality of compute nodes in distributed light transport simulation operation that is processed across the plurality of compute nodes, a ray against one or more first partitions stored at the first node, the one or more partitions being from partitions of a scene that are respectively stored amongst the plurality of compute nodes, the plurality of compute nodes corresponding to respective computing environments interconnected by one or more networks;

selecting, by the first node, a second node from the plurality of compute nodes based at least on determining the second node is storing one or more second partitions from the partitions;

based at least on the selecting, verifying that the second node has not yet intersection-tested the ray in the distributed light transport simulation operation using the one or more second partitions; and based at least on the verifying, providing to the second node over the one or more networks, one or more messages comprising data corresponding to the ray, the one or more messages causing the second node to perform one or more portions of the distributed light transport simulation operation.

12. The system of claim 11, wherein the selecting the second node from the plurality of compute nodes is based at least on determining one or more nodes of the plurality of compute nodes have intersection-tested the ray against one or more partitions processed using the plurality of compute nodes.

13. The system of claim 11, wherein the selecting the second node is based at least on:

executing, at the first node, at least a portion of the distributed light transport simulation operation; and determining the at least the portion of graphical data has not yet been intersection-tested against the ray using the second node based at least on the executing.

14. The system of claim 13, wherein the distributed light transport simulation operation is executed using a third node of the plurality of compute nodes based at least on determining the third node is used to generate the ray during an execution of the distributed light transport simulation operation.

15. The system of claim 11, wherein the selecting the second node is based at least on determining, using a list of one or more compute nodes of the plurality of compute nodes that have already intersection-tested the ray or one or more compute nodes of the plurality of compute nodes that have not yet intersection-tested the ray, that the second node has not yet intersection-tested the ray.

16. The system of claim 11, wherein the selecting the second node is further based at least on:

intersection testing, at least using the first node, the ray against at least one proxy volume corresponding to at least one partition of the partitions, the at least one partition being assigned to the second node; and identifying at least one intersection between the ray and the at least one proxy volume based at least on the intersection testing of the ray against the at least one proxy volume.

17. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing generative AI operations;

a system for performing operations using a large language model;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

18. At least one processor comprising:

one or more circuits to execute a light transport simulation operation for graphical rendering of a scene, the light transport simulation operation including operations to transmit, over one or more networks that interconnect respective computing environments, one or more messages comprising data corresponding to a ray of the scene from a first node of a plurality of compute nodes that correspond to the respective computing environments to a second node of the plurality of compute nodes based at least on:

selecting, by the first node, the second node from the plurality of compute nodes based at least on determining the second node is storing one or more partitions from partitions the scene that are respectively stored amongst the plurality of compute nodes; and based at least on the selecting, verifying that the second node has not yet intersection-tested the ray in the light transport simulation operation using the one or more partitions.

19. The at least one processor of claim 18, wherein the determining is based at least on executing, at the first node, at least a portion of a distributed light transport simulation operation for the scene.

20. The at least one processor of claim 18, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing generative AI operations;

a system for performing operations using a large language model;

a system for performing deep learning operations;

a system implemented using an edge device;

a system implemented using a robot;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

\* \* \* \* \*